United States Patent
Nevola et al.

(10) Patent No.: US 12,492,225 B2
(45) Date of Patent: Dec. 9, 2025

(54) MELANOCYTE-REGULATING PEPTIDES

(71) Applicant: IDP DISCOVERY PHARMA, S.L., Barcelona (ES)

(72) Inventors: Laura Nevola, Barcelona (ES); Santiago Esteban Martín, Barcelona (ES)

(73) Assignee: IDP DISCOVERY PHARMA, S.L., Barcelona (ES)

( * ) Notice: Subject to any disclaimer, the term of this patent is extended or adjusted under 35 U.S.C. 154(b) by 923 days.

(21) Appl. No.: 17/632,463

(22) PCT Filed: Jul. 31, 2020

(86) PCT No.: PCT/EP2020/071629
§ 371 (c)(1),
(2) Date: Feb. 2, 2022

(87) PCT Pub. No.: WO2021/023646
PCT Pub. Date: Feb. 11, 2021

(65) Prior Publication Data
US 2023/0312649 A1    Oct. 5, 2023

(30) Foreign Application Priority Data
Aug. 2, 2019 (EP) .................................... 19382674

(51) Int. Cl.
| | |
|---|---|
| *C07K 7/08* | (2006.01) |
| *A61K 8/64* | (2006.01) |
| *A61P 35/00* | (2006.01) |
| *A61Q 19/02* | (2006.01) |
| *A61K 38/00* | (2006.01) |

(52) U.S. Cl.
CPC .................. *C07K 7/08* (2013.01); *A61K 8/64* (2013.01); *A61P 35/00* (2018.01); *A61Q 19/02* (2013.01); *A61K 38/00* (2013.01)

(58) Field of Classification Search
CPC .............. C07K 7/08; A61P 35/00; A61K 8/64
See application file for complete search history.

(56) References Cited

U.S. PATENT DOCUMENTS

2008/0234183 A1 * 9/2008 Hallbrink .................. A61P 3/10
435/320.1

FOREIGN PATENT DOCUMENTS

| WO | WO 03/106491 A2 | 12/2003 | |
|---|---|---|---|
| WO | WO-2005117992 A2 * | 12/2005 | ......... A61K 38/1709 |
| WO | WO-2017157990 A1 * | 9/2017 | ............. A61K 38/17 |
| WO | WO 2019/025433 A1 | 2/2019 | |
| WO | WO 2019/115480 A1 | 6/2019 | |

OTHER PUBLICATIONS

Tan et al., 2016, Stapled peptide design: principles and roles of computation, Drug Discovery Today, 21(10): 1642-1653.*
Migon et al., 2018, Hydrocarbon Stapled Antimicrobial Peptides, The Protein Journal, 37: 2-12.*
International Search Report and Written Opinion mailed Oct. 12, 2020 for Application No. PCT/EP2020/071629, 16 pages.
Altschul, et al: "Basic local alignment search tool", Journal of Molecular Biology 1990; vol. 215, pp. 403-410.
Copolovici, et al: "Cell-Penetrating Peptides: Design, Synthesis, and Applications", ACS Nano 2014; vol. 8 (3), pp. 1972-1994.
Higgins, et al: "CLUSTAL V: improved software for multiple sequence alignment", CABIOS 1992; vol. 8(2), pp. 189-191.
Hsiao, et al: "The roles of microphthalmia-associated transcription factor and pigmentation in melanoma", Archives of Biochemistry and Biophysics 2014; vol. 563, pp. 28-34; doi:10.1016/J.ABB.2014.07.019, ISSN 0003-9861.
Kim, et al: "Synthesis of all-hydrocarbon stapled a-helical peptides by ring-closing olefin metathesis", Nature Protocols; May 12, 2011; vol. 6(6), pp. 761-771.
Kolb, et al: "The growing impact of click chemistry on drug discovery", Drug Discovery Today; Dec. 2003; vol. 8(24), pp. 1128-1137.
Miller, et al: "Application of Ring-Closing Metathesis to the Synthesis of Rigidified Amino Acids and Peptides", J. Am. Chem. Soc. 1996; vol. 118(40), pp. 9606-9614.
Murakami, et al: "Sumoylation modulates transcriptional activity of MITF in a promoter-specific manner", Pigment Cell Research; Mar. 26, 2005; vol. 18(4), pp. 265-277; doi:10.1111/j.1600-0749.2005.00234.x.
Murakami, et al: "Transcriptional activation of mouse mast cell protease-9 by microphthalmia-associated transcription factor", Biochemical and Biophysical Research Communications 2003; vol. 311(1), pp. 4-10; doi:10.1016/J.BBRC.2003.09.148, ISSN 0006-291X.

* cited by examiner

*Primary Examiner* — Amber D Steele
(74) *Attorney, Agent, or Firm* — Squire Patton Boggs (US) LLP

(57) ABSTRACT

The peptides of the invention have a sequence with at least 85% identity with a sequence SEQ ID NO: 1 or 2.
These peptides regulate melanocyte activity in terms of proliferation and production of melanin. Therefore, they are useful in the treatment of melanomas but also of cosmetic cutaneous hyper or hypopigmentation.

20 Claims, 1 Drawing Sheet
Specification includes a Sequence Listing.

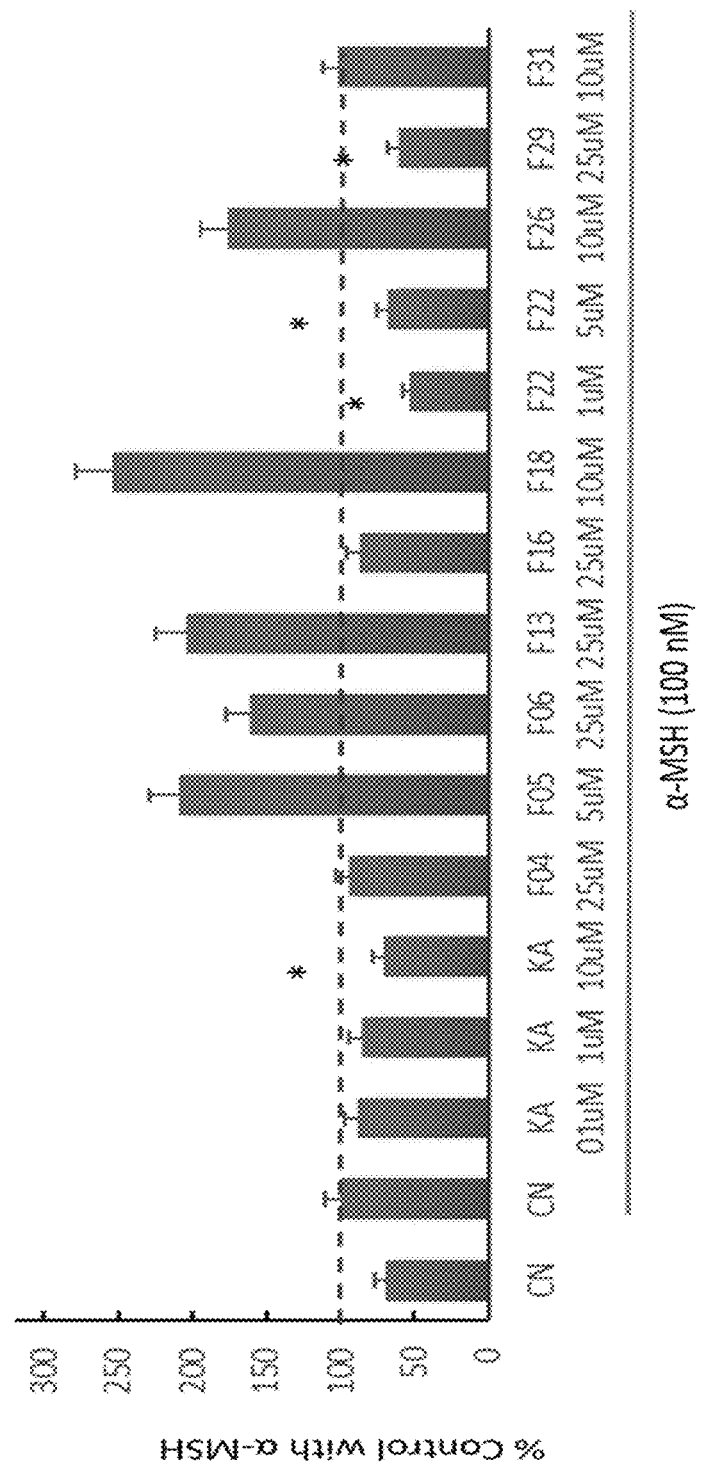

MELANOCYTE-REGULATING PEPTIDES

CROSS-REFERENCE TO RELATED APPLICATIONS

The present application is a 35 U.S.C. § 371 national-phase filing of International Application No. PCT/EP2020/071629, filed on Jul. 31, 2020, which claims the benefit of European Patent Application EP19382674.0, filed on Aug. 2, 2019, both of which applications are incorporated herein by reference in their entirety.

INCORPORATION BY REFERENCE

This application contains a sequence listing entitled "P5219PC00_Corrected_ST25.txt," being submitted herein in ASCII format via EFS-Web, which is an amended copy of the sequence listing as filed in the PCT/EP2020/071629 and is 27,498 bytes in size.

TECHNICAL FIELD

This invention generally relates to the field of melanocyte-related disorders. In particular, the present invention refers to peptides with the ability to regulate melanogenesis, either promoting or reducing the production of melanin, as well as to inhibit the proliferation of malignant melanocytes; to pharmaceutical and cosmetical compositions containing thereof as an active ingredients, as well as to their use in therapy and cosmetics.

BACKGROUND ART

Through a process called melanogenesis, melanocytes produce melanin, which is a pigment found in the skin, eyes, hair, nasal cavity, and inner ear. This melanogenesis leads to a long-lasting pigmentation, which is in contrast to the pigmentation that originates from oxidation of already-existing melanin.

There are both basal and activated levels of melanogenesis; in general, lighter-skinned people have low basal levels of melanogenesis. Exposure to UV-B radiation causes increased melanogenesis. The purpose of melanogenesis is to protect the hypodermis, the layer under the skin, from damage by UV-B radiation. The color of the melanin is black, allowing it to absorb a majority of the UV-B light and block it from passing through the epidermis.

It is known that during the life of a person apparent changes in the coloring of his/her skin develop and thus, for example, marks on the skin of the face, chest and hands of elderly people appear which are clear signs of aging. Furthermore, the continuous overexposure to UV radiation does not just cause accelerated aging of the skin, known as photoaging, which is characterized by the appearance of signs of skin aging at a much earlier age, among them the appearance of marks in those areas of the skin overexposed to UV radiation, but which can also give rise to the formation of hyperpigmented cancerous lesions or melanomas.

It frequently occurs that in an area of a person's skin the density of melanin within the melanocytes is greater than in the surrounding areas and as a consequence the color of the affected area on that person is darker than the rest. These areas are known as areas of hyperpigmentation. Among the causes of hyperpigmentation are hormonal changes, melasma, lentigo, piebaldism, Addison's disease, hypersensitivity to ultraviolet radiation due to agents which favor the action of radiation (phototoxics), or hyperpigmentation as a consequence of an inflammatory lesion. The marks associated with acne, eczema, scars or hair removal belong to this last type of hyperpigmentation and are marks that can even last several years.

It is also possible for a person's skin areas which have lower melanin densities than that in surrounding areas. Vitiligo, pityriasis alba, tinea versicolor, and postinflammatory effect are common causes of pigment loss. The attenuation of the irregularities of pigmentation are either due to aging and/or photoaging, to hormonal disorders or to post-inflammatory processes and, particularly, the re-establishment of the pigmentation in the areas affected by vitiligo with topical applications is, therefore, of interest to the cosmetic and pharmaceutical sector.

Pigmentary disorders are a global problem. Despite being common, pigmentary disorders remain difficult to treat.

The main approaches for the treatment of hyperpigmentation disorders are mainly based on preventing the production of melanin by hyperactive melanocytes or promoting removal of melanin from the epidermis by increasing epidermal cell turnover. A number of agents that inhibit tyrosinase, the rate-limiting enzyme involved in melanin synthesis, are currently used to treat disorders of hyperpigmentation with moderate success. These agents include hydroquinone, kojic acid (also referred as "KA"), arbutin, mequinol and azelaic acid. Contact dermatitis is a common side effect occurring in up to 15% of patients who use these agents, limiting their usage. The efficacy of these agents varies significantly from patient to patient. Topical retinoids reduce epidermal melanin via inhibition of tyrosinase and also increase epidermal turnover, thereby facilitating melanin dispersion and removal. However, irritant dermatitis can be a frequent adverse effect, and caution should be used when prescribing higher concentrations of topical retinoids in darker skin types, since resulting irritation may result in erythema, desquamation and further postinflammatory hyperpigmentation. Laser therapy may sometimes be effective for hyperpigmentation. This poses, however, a significant problem in darker skinned patients, who have increased baseline epidermal melanin that is also targeted at these wavelengths.

Disorders of depigmentation also involve an inflammatory and autoimmune pathogenesis, so topical corticosteroids and immunomodulators may be useful in the treatment regimen. Because postinflammatory hypopigmentation is usually clinically apparent after the inflammatory process has resolved, these same topical agents may not be beneficial at this late stage. Light therapy, including but not limited to psoralens plus UVA (oral or topical), psoralens and natural sunlight, UVB, narrow-band UVB and 308 nm excimer lasers have been used to treat both hypopigmentation and depigmentation. Disorders of depigmentation (e.g., vitiligo) may be particularly difficult to treat because there is complete absence of melanocytes in the interfollicular epidermis. Hence, therapy is aimed at recruiting or transplanting melanocytes to these sites.

In spite of the efforts made, therefore, there is still the need of developing further molecules (peptides) which can efficiently regulate melanocyte activity and, consequently, can be efficient in the treatment of pigmentary disorders.

SUMMARY OF INVENTION

The present inventors have found that peptides of sequences SEQ ID NO: 1 and 2 efficiently regulate melanocyte activity.

On one hand, the present inventors have surprisingly found that the peptides of the invention are involved in melanogenesis pathway. Thus, some of the peptides stimulated the production of melanin, which can be an indicia of melanocyte activation, whereas others, such as F22 and F29, drastically reduced the amount of melanin. What is even more remarkable is the fact that the peptides of the invention were more efficient in regulating melanin production when compared with other compounds known in the state of the art. In this regard, it was found that when KA, which is commonly used in hyperpigmentation, was used at a concentration of 1 μM, the reduction was substantially lower than the reduction achieved with the peptides of the invention at the same concentration. Therefore, these data do not only support the effect of the peptides of the invention on melanin-production, but also illustrates that they are even more efficient than other compounds available in the state of the art currently used with the same purpose.

On the other hand, the present inventors have also found that these peptides regulate melanocyte activity not only in terms of melanin formation, but also in terms of cell proliferation. As it is shown in Table 2, the peptides of the invention were active in inhibiting cancer cell proliferation, in particular melanoma cell lines, including metastatic melanoma cell lines.

Thus, in a first aspect the present invention provides a peptide or a pharmaceutical or cosmetical acceptable salt thereof, the peptide having an amino acid sequence with at least 85% identity with respect sequence SEQ ID NO: 1 or 2:

(SEQ ID NO: 1)
$(Trp)_m$-$(Asn)_n$-Lys-Gly-Thr-Ile-Leu-Lys-Ala-Ser-Val-Asp-Tyr-Ile-Arg-Lys-$(Leu)_p$-$(Gln)_q$ (SEQ ID NO: 2)
$(Arg)_{mx}$-$(Arg)_{nx}$-Arg-Arg-Phe-Asn-Ile-Asn-Asp-Arg-Ile-Lys-Glu-Leu-Gly-Thr-Leu-$(Ile)_{px}$-$(Pro)_{qx}$ wherein
"m", "n", "p", and "q" represent integers and are selected from 0 and 1;
"$m_x$", "$n_x$", "$p_x$", and "$q_x$" represent integers and are selected from 0 and 1;
a C-terminal end corresponding to —$C(O)R_4$;
a N-terminal end corresponding to —$NHR_5$;
$R_4$ is a radical selected from the group consisting of —OH and —$NR_{17}R_{18}$;
$R_5$ is a radical selected from the group consisting of —H, $(C_1-C_{20})$alkyl and $(C_1-C_{10})$alkyl substituted by one or more radicals selected from the group consisting of: halogen, $(C_1-C_{10})$alkyl, —$OR_6$, —$NR_7R_8$, —$SR_9$, —$SOR_{10}$, —$SO_2R_{11}$, and —$CO_2R_{12}$; and
$R_{17}$ and $R_{18}$ are radicals independently selected from the group consisting of: —H and $(C_1-C_{10})$alkyl, and $(C_1-C_{10})$alkyl substituted by one or more radicals selected from the group consisting of: halogen, $(C_1-C_{10})$alkyl, —$OR_6$, —$NR_7R_8$, —$SR_9$, —$SOR_{10}$, —$SO_2R_{11}$, and —$CO_2R_{12}$; the peptide optionally including a linker biradical "L" of formula (I)

$$-[(R_1)_a-(R_2)-(R_3)_b]_c- \qquad (I)$$

which is connecting an alpha carbon atom of an amino acid located at position "i" with an alpha carbon atom of an amino acid located at position "i+4" or "i+7" in the peptide sequence wherein
"a" and "b" are the same or different and are 0 or 1;
"c" is comprised from 1 to 10;
$R_1$ and $R_3$ are biradicals independently selected from the group consisting of: $(C_1-C_{10})$alkyl; $(C_1-C_{10})$alkyl substituted by one or more radicals selected from the group consisting of: halogen, $(C_1-C_{10})$alkyl, —$OR_6$, —$NR_7R_8$, —$SR_9$, —$SOR_{10}$, —$SO_2R_{11}$, and —$CO_2R_{12}$; $(C_2-C_{10})$alkenyl; $(C_2-C_{10})$alkenyl substituted by one or more radicals selected from the group consisting of: halogen, $(C_1-C_{10})$alkyl, —$OR_6$, —$NR_7R_8$, —$SR_9$, —$SOR_{10}$, —$SO_2R_{11}$, and —$CO_2R_{12}$; $(C_2-C_{10})$alkynyl; and $(C_2-C_{10})$alkynyl substituted by one or more radicals selected from the group consisting of: halogen, $(C_1-C_{10})$alkyl, —$OR_6$, —$NR_7R_8$, —$SR_9$, —$SOR_{10}$, —$SO_2R_{11}$, and —$CO_2R_{12}$;
$R_2$ is a biradical selected from the group consisting of: —O—, C(=O), C(=O)$NR_{13}$, C(=O)O, S(=O), S(=O)$_2$, $NR_{14}$, $(C_1-C_{10})$alkyl, $(C_2-C_{10})$alkenyl, $(C_2-C_{10})$alkynyl, —$NR_{15}$—$NR_{16}$—, —N=N—, —S—S—, and a known ring system comprising from 3 to 14 members, the system comprising from 1 to 3 rings, where:
each one of the rings is saturated, partially unsaturated, or aromatic;
the rings are isolated, partially or totally fused,
each one of the members forming the known ring system is selected from the group consisting of: —CH—, —$CH_2$—, —NH—, —N—, —SH—, —S—, and —O—; and
the ring system is optionally substituted by one or more radicals independently selected from the group consisting of halogen, —OH, —$NO_2$, $(C_1-C_{10})$alkyl, $(C_1-C_{10})$haloalkyl, and $(C_1-C_{10})$alkyl-O—; and
$R_6$, $R_7$, $R_8$, $R_9$, $R_{10}$, $R_{11}$, $R_{12}$, $R_{13}$, $R_{14}$, $R_{15}$, and $R_{16}$ are radicals independently selected from the group consisting of: —H and $(C_1-C_{10})$alkyl; and
the amino acids which are connected by the linker being of formula (II)

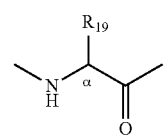

(II)

wherein
$R_{19}$ is a monoradical selected from the group consisting of: $(C_1-C_{10})$alkyl, $(C_2-C_{10})$alkenyl, $(C_2-C_{10})$alkynyl, and a known ring system comprising from 3 to 14 members, the system comprising from 1 to 3 rings, where:
each one of the rings is saturated, partially unsaturated, or aromatic;
the rings are isolated, partially or totally fused,
each one of the members forming the known ring system is selected from the group consisting of: —CH—, —$CH_2$—, —NH—, —N—, —SH—, —S—, and —O—.

In a second aspect, the present invention provides a cosmetical or pharmaceutical composition comprising a cosmetically or therapeutically effective amount of the peptide as defined in the first aspect of the invention together with acceptable cosmetical or pharmaceutical excipients and/or carriers.

In a third aspect, the present invention provides the peptide or pharmaceutical salt thereof as defined in the first aspect of the invention or the pharmaceutical composition of the second aspect of the invention, for use as a medicament. This aspect can be alternatively formulated as the use of a peptide or pharmaceutical salt thereof as defined in the first aspect of the invention or the pharmaceutical composition of the second aspect of the invention, in the manufacture of a medicament for the treatment of a disease. This aspect can also be alternatively formulated as a method for the treatment of a disease, the method comprising administering an effective therapeutic amount of a peptide or pharmaceutical salt thereof as defined in the first or the pharmaceutical composition of the second aspect of the invention, to a subject in need thereof.

In a fourth aspect, the present invention provides the peptide or pharmaceutical salt thereof as defined in the first aspect of the invention or the pharmaceutical composition as defined in the second aspect of the invention for use in the treatment of cancer. This aspect can alternatively be formulated as the use of the peptide or pharmaceutical salt thereof as defined in the first aspect of the invention or the pharmaceutical composition as defined in the second aspect of the invention in the manufacture of a medicament for the treatment of cancer. This aspect can also be alternatively formulated as a method for the treatment of cancer, the method comprising administering an effective therapeutic amount of the peptide or pharmaceutical salt thereof as defined in the first aspect of the invention or the pharmaceutical composition as defined in the second aspect of the invention, to a subject in need thereof.

In a fifth aspect the present invention also provides the non-therapeutic use of a peptide or cosmetical salt thereof as defined in the first aspect of the invention or a cosmetical composition as defined in the second aspect of the invention for regulating melanogenesis, particularly for reducing or increasing the production of melanin.

In a last aspect the present invention provides a cosmetical method for the treatment of the hyper- or hypopigmentation in a subject in need thereof, the method comprising the application of the peptide or cosmetical salt thereof as defined in the first aspect or the cosmetical composition as defined in the second aspect of the invention to the affected area suffering from the hyper- or hypopigmentation.

In further aspects the present invention provides: (a) a combination comprising the peptide or pharmaceutical salt thereof as defined in the first or second aspect of the invention; and a therapeutic agent, particularly an anti-cancer agent; (b) a combination comprising the peptide or pharmaceutical salt thereof as defined in the first or second aspect of the invention; and a therapeutic agent, particularly an anti-cancer agent, for use as a medicament, more particularly for use in the treatment of cancer; (c) a peptide or pharmaceutical salt thereof as defined in the first or second aspect of the invention for use in combination therapy for the prevention or treatment of cancer, wherein the therapy comprises its administration to a subject simultaneously, sequentially or separately with an anti-cancer agent; and (d) an anti-cancer agent for use in combination therapy with the peptide or pharmaceutical salt thereof as defined in the first or second aspect of the invention, wherein the use comprises the prevention or treatment of cancer.

BRIEF DESCRIPTION OF DRAWINGS

FIG. 1 shows the percentage of melanin in treated melanoma cells with respect to that of untreated melanoma cells. As positive control Kojic Acid (KA) was used at different concentrations (0.1, 1 and 10 UM).

DETAILED DESCRIPTION OF THE INVENTION

All terms as used herein in this application, unless otherwise stated, shall be understood in their ordinary meaning as known in the art. Other more specific definitions for certain terms as used in the present application are as set forth below and are intended to apply uniformly through-out the specification and claims unless an otherwise expressly set out definition provides a broader definition.

For the purposes of the present invention, any ranges given include both the lower and the upper end-points of the range.

The present invention provides peptides comprising sequences with at least 85% degree identity with SEQ ID NO: 1 or 2, as it has been stated above.

In the present invention the term "identity" refers to the percentage of residues that are identical in the two sequences when the sequences are optimally aligned. If, in the optimal alignment, a position in a first sequence is occupied by the same amino acid residue as the corresponding position in the second sequence, the sequences exhibit identity with respect to that position. The level of identity between two sequences (or "percent sequence identity") is measured as a ratio of the number of identical positions shared by the sequences with respect to the size of the sequences (i.e., percent sequence identity=(number of identical positions/total number of positions)×100).

A number of mathematical algorithms for rapidly obtaining the optimal alignment and calculating identity between two or more sequences are known and incorporated into a number of available software programs. Examples of such programs include the MATCH-BOX, MULTAIN, GCG, FASTA, and ROBUST programs for amino acid sequence analysis, among others. Preferred software analysis program is include the ALIGN, CLUSTAL W, and BLAST programs (e.g., BLAST 2.1, BL2SEQ, and later versions thereof).

For amino acid sequence analysis, a weight matrix, such as the BLOSUM matrixes (e.g., the BLOSUM45, BLOSUM50, BLOSUM62, and BLOSUM80 matrixes), Gonnet matrixes, or PAM matrixes (e.g., the PAM30, PAM70, PAM120, PAM160, PAM250, and PAM350 matrixes), are used in determining identity.

The BLAST programs provide analysis of at least two amino acid sequences, either by aligning a selected sequence against multiple sequences in a database (e.g., GenSeq), or, with BL2SEQ, between two selected sequences. BLAST programs are preferably modified by low complexity filtering programs such as the DUST or SEG programs, which are preferably integrated into the BLAST program operations. If gap existence costs (or gap scores) are used, the gap existence cost preferably is set between about −5 and −15. Similar gap parameters can be used with other programs as appropriate. The BLAST programs and principles underlying them are further described in, e.g., Altschul et al., "Basic local alignment search tool", 1990, J. Mol. Biol, v. 215, pages 403-410.

For multiple sequence analysis, the CLUSTAL W program can be used. The CLUSTAL W program desirably is run using "dynamic" (versus "fast") settings. Amino acid sequences are evaluated using a variable set of BLOSUM matrixes depending on the level of identity between the sequences. The CLUSTAL W program and underlying principles of operation are further described in, e.g., Higgins et al., "CLUSTAL V; improved software for multiple sequence alignment", 1992, CABIOS, 8 (2), pages 189-191.

As used herein, the term "pharmaceutical or cosmetical acceptable salt" refers to those salts which are, within the scope of sound medical judgment, suitable for use in contact with the tissues of humans and lower animals without undue toxicity, irritation, allergic response and the like, and are commensurate with a reasonable benefit/risk ratio. Pharmaceutical and cosmetical acceptable salts are well known in the art. Examples of pharmaceutical and cosmetical acceptable, nontoxic acid addition salts are salts of an amino group formed with inorganic acids such as hydrochloric acid, hydrobromic acid, phosphoric acid, sulfuric acid and perchloric acid or with organic acids such as acetic acid, trifluoroacetic acid, oxalic acid, maleic acid, tartaric acid, citric acid, succinic acid or malonic acid or by using other methods used in the art such as ion exchange. Other pharmaceutical and cosmetical acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, and ammonium. Representative alkali or alkaline earth metal salts include sodium, lithium, potassium, calcium, magnesium, and the like. Further pharmaceutical and cosmetical acceptable salts include, when appropriate, nontoxic ammonium, quaternary ammonium, and amine cations formed using counterions such as halide, hydroxide, carboxylate, sulfate, phosphate, nitrate, lower alkyl sulfonate and aryl sulfonate.

The term $(C_1-C_{10})$alkyl refers to a saturated straight or branched alkyl chain having from 1 to 10 carbon atoms. Illustrative non-limitative examples are: methyl, ethyl, propyl, isopropyl, butyl, isobutyl, sec-butyl, tert-butyl, n-pentyl, neo-pentyl and n-hexyl.

The term $(C_1-C_{20})$alkyl refers to a saturated straight or branched alkyl chain having from 1 to 20 carbon atoms.

The term $(C_2-C_{10})$alkenyl refers to a saturated straight, or branched alkyl chain containing from 2 to 10 carbon atoms and also containing one or more double bonds. Illustrative non-limitative examples are ethenyl, propenyl, butenyl, 1-methyl-2-buten-1-yl, and the like.

The term $(C_2-C_{10})$alkynyl refers to a saturated straight, or branched alkyl chain containing from 2 to 20 carbon atoms and also containing one or more triple bonds. Examples include, among others, ethynyl, 1-propynyl, 2-butynyl, 1,3-butadinyl, 4-pentynyl, and 1-hexynyl.

The term "halogen" refers to the group in the periodic table consisting of five chemically related elements: fluorine (F), chlorine (Cl), bromine (Br), iodine (I), and astatine (At).

The term $(C_1-C_{10})$haloalkyl refers to a group resulting from the replacement of one or more hydrogen atoms from a $(C_1-C_{10})$alkyl group with one or more, preferably from 1 to 6, halogen atoms, which can be the same or different. Examples include, among others, trifluoromethyl, fluoromethyl, 1-chloroethyl, 2-chloroethyl, 1-fluoroethyl, 2-fluoroethyl, 2-bromoethyl, 2-iodoethyl, 2,2,2-trifluoroethyl, pentafluoroethyl, 3-fluoropropyl, 3-chloropropyl, 2,2,3,3-tetrafluoropropyl, 2,2,3,3,3-pentafluoropropyl, heptafluoropropyl, 4-fluorobutyl, and nonafluorobutyl.

The term "known" ring system as used herein refers to a ring system which is chemically feasible and is known in the art and so intends to exclude those ring systems that are not chemically possible.

According to the present invention when the ring system is formed by "isolated" rings means that the ring system is formed by two, three or four rings and said rings are bound via a bond from the atom of one ring to the atom of the other ring. The term "isolated" also embraces the embodiment in which the ring system has only one ring. Illustrative non-limitative examples of known ring systems consisting of one ring are those derived from: cyclopropyl, cyclobutyl, cyclopentyl, cyclohexyl, cycloheptyl, cyclopropenyl, cyclobutenyl, cyclopentenyl, phenyl, and cycloheptenyl.

According to the present invention when the ring system has rings "totally fused", means that the ring system is formed by two, three or four rings in which two or more atoms are common to two adjoining rings. Illustrative non-limitative examples are 1,2,3,4-tetrahydronaphthyl, 1-naphthyl, 2-naphthyl, anthryl, or phenanthryl.

According to the present invention when the ring system is "partially fused" it means that the ring system is formed by three or four rings, being at least two of said rings totally fused (i.e. two or more atoms being common to the two adjoining rings) and the remaining ring(s) being bound via a bond from the atom of one ring to the atom of one of the fused rings.

Unless otherwise stated, the amino acids forming the peptides of the invention can have L- or D-configuration.

Amino acids used in the construction of peptides of the present invention may be prepared by organic synthesis, or obtained by other routes, such as, for example, degradation of or isolation from a natural source.

In one embodiment of the first aspect of the invention, the peptide is other than one of sequence SEQ ID NO: 24, 25 or 26.

In one embodiment of the first aspect of the invention, optionally in combination with any of the embodiments provided above or below, the peptide is one wherein m and n are the same. In another embodiment of the first aspect of the invention, optionally in combination with any of the embodiments provided above or below, the peptide is one wherein p and q are the same. In another embodiment of the first aspect of the invention, optionally in combination with any of the embodiments provided above or below, m and n represent 1 and p and q represent 0. In another embodiment of the first aspect of the invention, optionally in combination with any of the embodiments provided above or below, m and n represent 0 and p and q represent 1.

In another embodiment of the first aspect of the invention, optionally in combination with any of the embodiments provided above or below, the peptide is a lineal peptide.

In the present invention the term "lineal peptide" means that it does not include the "L" biradical.

In one embodiment of the first aspect of the invention, optionally in combination with any of the embodiments provided above or below, the peptide is a lineal peptide consisting of SEQ ID NO: 1, wherein:
when "m" and "n" are the same, then "p" is different from "q"; and
when m is 0, and n=p=1, then q is 1.

In another embodiment of the first aspect of the invention, optionally in combination with any of the embodiments provided above or below, the peptide is a lineal peptide consisting of SEQ ID NO: 1, and is selected from the peptides wherein:
at least three of m, n, p and q are the same; or, alternatively,
when "m" is 0 and "n" is 1, then "p" is 0 and "q" is 0 or 1; or, alternatively
when "m" is 0 and "n" is 1, then "p" is 0 or 1, and "q" is 1.

In one embodiment of the first aspect of the invention, optionally in combination with any of the embodiments provided above or below, the peptide is one wherein $m_x$ and $n_x$ are the same. In another embodiment of the first aspect of the invention, optionally in combination with any of the embodiments provided above or below, the peptide is one wherein $p_x$ and $q_x$ are the same. In another embodiment of the first aspect of the invention, optionally in combination with any of the embodiments provided above or below, $m_x$ and $n_x$ represent 1 and $p_x$ and $q_x$ represent 0. In another embodiment of the first aspect of the invention, optionally in combination with any of the embodiments provided above or below, $m_x$ and $n_x$ represent 0 and $p_x$ and $q_x$ represent 1.

In another embodiment of the first aspect of the invention, optionally in combination with any of the embodiments provided above or below, the peptide or salt thereof is one comprising a "L" linker wherein a=1. In another embodiment of the first aspect of the invention, optionally in combination with any of the embodiments provided above or below, the peptide or salt thereof is one comprising a "L" linker wherein b=1. In another embodiment of the first aspect of the invention, optionally in combination with any of the embodiments provided above or below, the peptide or salt thereof is one comprising a "L" linker wherein c=1. In another embodiment of the first aspect of the invention, optionally in combination with any of the embodiments provided above or below, the peptide or salt thereof is one comprising a "L" linker wherein a=b=c=1.

In another embodiment of the first aspect of the invention, optionally in combination with any of the embodiments provided above or below, the peptide or salt thereof is one comprising a "L" linker wherein $R_1$ and $R_3$ are biradicals independently selected from the group consisting of: $(C_1$-$C_{10})$alkyl; $(C_2$-$C_{10})$alkenyl; and $(C_2$-$C_{10})$alkynyl. In another embodiment of the first aspect of the invention, optionally in combination with any of the embodiments provided above or below, the peptide or salt thereof is one comprising a "L" linker wherein $R_1$ and $R_3$ are the same or different and represent $(C_1$-$C_{10})$alkyl.

In another embodiment of the first aspect of the invention, optionally in combination with any of the embodiments provided above or below, the peptide or salt thereof is one comprising a "L" linker wherein $R_2$ is a biradical selected from the group consisting: —O—, C(=O), C(=O)$NR_{13}$, C(=O)O, S(=O), S(=O)$_2$, $NR_{14}$, $(C_1$-$C_{10})$alkyl, $(C_2$-$C_{10})$alkenyl, $(C_2$-$C_{10})$alkynyl, —$NR_{15}$—$NR_{16}$—, —N=N—, —S—S—, and a known ring system consisting of one ring from 3 to 6 members, the ring:
being saturated, partially unsaturated, or aromatic;
each one of the members forming the known ring system being selected from the group consisting of: —CH—, —CH$_2$—, —NH—, —N—, —SH—, —S—, and —O—; and
the ring system being optionally substituted by one or more radicals independently selected from the group consisting of halogen, —OH, —NO$_2$, $(C_1$-$C_{10})$alkyl, $(C_1$-$C_{10})$haloalkyl, and $(C_1$-$C_{10})$alkyl-O—.

In another embodiment of the first aspect of the invention, optionally in combination with any of the embodiments provided above or below, the peptide or salt thereof is one comprising a "L" linker wherein $R_2$ is a biradical selected from the group consisting of: $(C_1$-$C_{10})$alkyl, $(C_2$-$C_{10})$alkenyl, and $(C_2$-$C_{10})$alkynyl. In another embodiment of the first aspect of the invention, optionally in combination with any of the embodiments provided above or below, the peptide or salt thereof is one comprising a "L" linker wherein $R_2$ is $(C_2$-$C_{10})$alkenyl.

In another embodiment of the first aspect of the invention, optionally in combination with any of the embodiments provided above or below, the peptide or salt thereof is one comprising a "L" linker wherein $R_1$ and $R_3$ are the same or different and represent $(C_1$-$C_{10})$alkyl; and $R_2$ is $(C_2$-$C_{10})$alkenyl.

In another embodiment of the first aspect of the invention, optionally in combination with any of the embodiments provided above or below, the peptide or salt thereof is one comprising a "L" linker wherein $R_1$ and $R_3$ are the same or different and represent $(C_1$-$C_{10})$alkyl; $R_2$ is $(C_2$-$C_{10})$alkenyl; and a=b=c=1.

In another embodiment of the first aspect of the invention, optionally in combination with any of the embodiments provided above or below, the peptide or salt thereof is one wherein $R_{19}$ is selected from the group consisting of: $(C_1$-$C_{10})$alkyl, $(C_2$-$C_{10})$alkenyl, and $(C_2$-$C_{10})$alkynyl. In another embodiment of the first aspect of the invention, optionally in combination with any of the embodiments provided above or below, the peptide or salt thereof is one wherein $R_{19}$ is a $(C_1$-$C_{10})$alkyl monoradical. In another embodiment of the first aspect of the invention, optionally in combination with any of the embodiments provided above or below, the peptide or salt thereof is one comprising a "L" linker wherein $R_1$, $R_3$ and Rig are the same or different and represent $(C_1$-$C_{10})$alkyl; and $R_2$ is $(C_2$-$C_{10})$alkenyl.

In another embodiment of the first aspect of the invention, optionally in combination with any of the embodiments provided above or below, the peptide or salt thereof is one wherein $R_4$ is —OH (i.e., the C-terminal end is —C(O)OH). In another embodiment of the first aspect of the invention, optionally in combination with any of the embodiments provided above or below, the peptide or salt thereof is one wherein $R_4$ is —$NR_{17}R_{18}$, $R_{17}$ and $R_{18}$ meaning the same. In another embodiment of the first aspect of the invention, optionally in combination with any of the embodiments provided above or below, the N-terminal end corresponds to —NH$_2$. In another embodiment of the first aspect of the invention, optionally in combination with any of the embodiments provided above or below, the C-terminal and N-terminal ends of the peptide of the invention are, respectively, —C(O)OH and —NH$_2$. In another embodiment of the first aspect of the invention, optionally in combination with any of the embodiments provided above or below, the C-terminal and N-terminal ends of the peptide of the invention are, respectively, —C(O)NH$_2$ and —NH$_2$.

In another embodiment of the first aspect of the invention, optionally in combination with any of the embodiments provided above or below, the C-terminal and N-terminal ends of the peptide of the invention are, respectively, —C(O)OH and —NHR$_5$, wherein $R_5$ is selected from $(C_1$-$C_{20})$alkyl and $(C_1$-$C_{10})$alkyl substituted by one or more radicals selected from the group consisting of: halogen, $(C_1$-$C_{10})$alkyl, —OR$_6$, —NR$_7$R$_8$, —SR$_9$, —SOR$_{10}$, —SO$_2$R$_{11}$, and —CO$_2$R$_{12}$.

In another embodiment of the first aspect of the invention, optionally in combination with any of the embodiments provided above or below, the C-terminal and N-terminal ends of the peptide of the invention are, respectively, —C(O)R$_4$ and —NH$_2$, wherein R$_4$ means —NHR$_{18}$, and R$_{18}$ is a radical selected from the group consisting of: (C$_1$-C$_{10}$)alkyl and (C$_1$-C$_{10}$)alkyl substituted by one or more radicals selected from the group consisting of: halogen, (C$_1$-C$_{10}$)alkyl, —OR$_6$, —NR$_7$R$_8$, —SR$_9$, —SOR$_{10}$, —SO$_2$R$_{11}$, and —CO$_2$R$_{12}$.

In another embodiment of the first aspect of the invention, optionally in combination with any of the embodiments provided above or below, the C-terminal and N-terminal ends of the peptide of the invention are, respectively, —C(O)R$_4$ and —NH$_2$, wherein R$_4$ means —NR$_{17}$R$_{18}$, and R$_{17}$ and R$_{18}$ are radicals independently selected from the group consisting of: (C$_1$-C$_{10}$)alkyl and (C$_1$-C$_{10}$)alkyl substituted by one or more radicals selected from the group consisting of: halogen, (C$_1$-C$_{10}$)alkyl, —OR$_6$, —NR$_7$R$_8$, —SR$_9$, —SOR$_{10}$, —SO$_2$R$_{11}$, and —CO$_2$R$_{12}$.

In another embodiment of the first aspect of the invention, optionally in combination with any of the embodiments provided above or below, the linker biradical of formula (I) is between an alpha carbon atom of an amino acid located at position "i" in the peptide sequence of sequence SEQ ID NO: 1 and an alpha carbon atom of an amino acid located at position "i+7" in the peptide sequence SEQ ID NO: 1.

In another embodiment of the first aspect of the invention, optionally in combination with any of the embodiments provided above or below, the peptide or salt thereof is selected from the group consisting of amino acid sequences SEQ ID NO: 3 to 8:

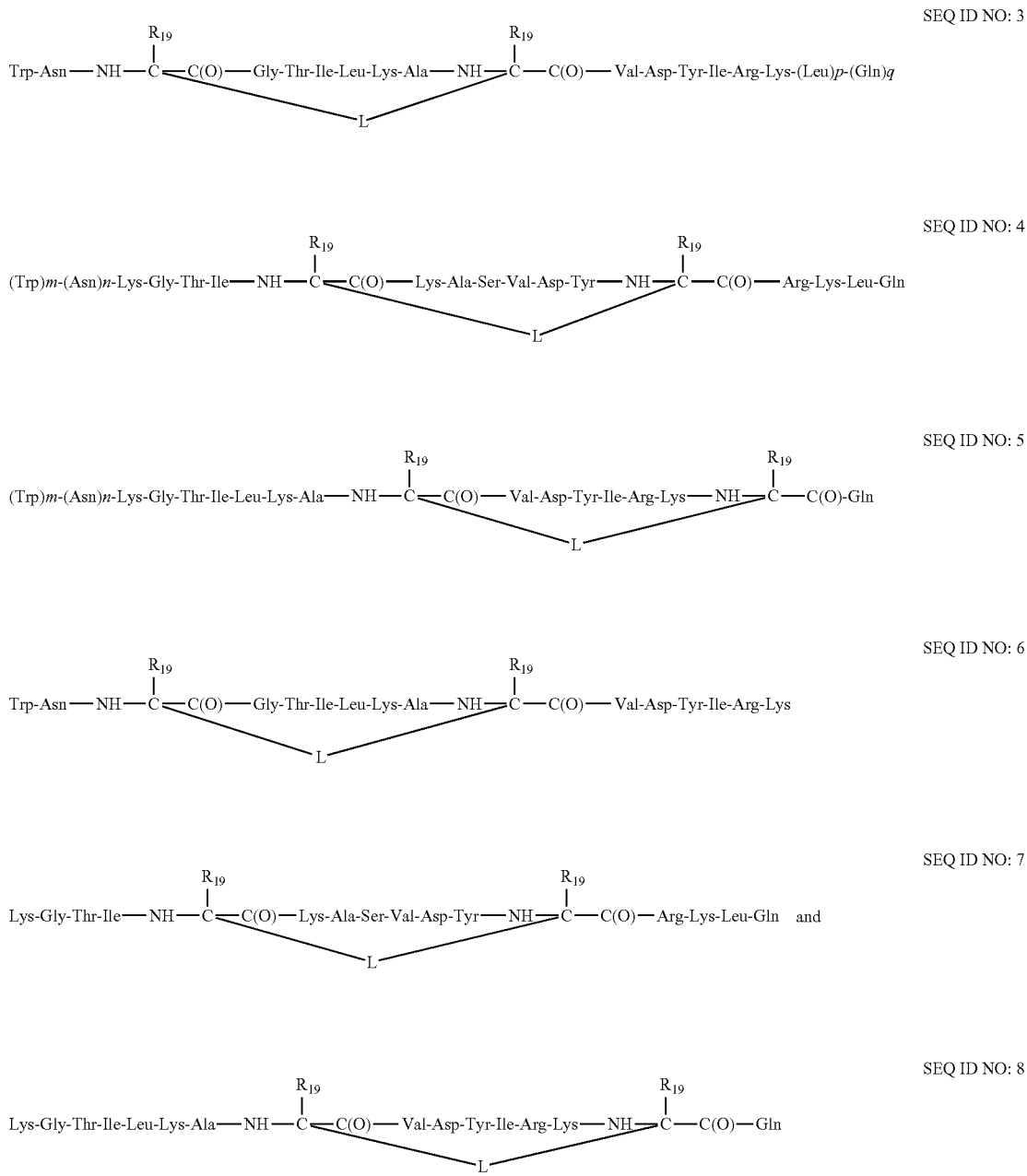

wherein "m", "n", "p", "q", "L" and "R$_{19}$" are as defined in any of the previous embodiments.

In another embodiment of the first aspect of the invention, optionally in combination with any of the embodiments provided above or below, the linker biradical of formula (I) is between an alpha carbon atom of an amino acid located at position "i" in the peptide sequence of SEQ ID NO: 2 and an alpha carbon atom of an amino acid located at position "i+7" in the peptide sequence of SEQ ID NO: 2.

In another embodiment of the first aspect of the invention, optionally in combination with any of the embodiments provided above or below, the peptide or salt thereof is selected from the group consisting of amino acid sequences SEQ ID NO: 9 to 16:

with at least 85% identity with a sequence SEQ ID NO: 3 to 8, wherein R$_1$, R$_3$ and R$_{19}$ are the same or different and represent (C$_1$-C$_{10}$)alkyl; and R$_2$ is (C$_2$-C$_{10}$)alkenyl. In another embodiment of the first aspect of the invention, optionally in combination with any of the embodiments provided above or below, the peptide or salt thereof is one with at least 85% identity with a sequence SEQ ID NO: 3 to 8, wherein R$_1$, R$_3$ and R$_{19}$ are the same or different and represent (C$_1$-C$_{10}$)alkyl; R$_2$ is (C$_2$-C$_{10}$)alkenyl; the C-terminal is selected from —C(O)OH; and —CONH$_2$ and the N-terminal end is —NH$_2$.

In another embodiment of the first aspect of the invention, optionally in combination with any of the embodiments provided above or below, the peptide or salt thereof is one

wherein "m$_x$", "n$_x$", "p$_x$", "q$_x$", "L" and "R$_{19}$" are as defined in any of the previous embodiments.

In another embodiment of the first aspect of the invention, optionally in combination with any of the embodiments provided above or below, the peptide or salt thereof is one with at least 85% identity with a sequence SEQ ID NO: 9 to 16, wherein R$_1$, R$_3$ and R$_{19}$ are the same or different and represent (C$_1$-C$_{10}$)alkyl; and R$_2$ is (C$_2$-C$_{10}$)alkenyl. In another embodiment of the first aspect of the invention, optionally in combination with any of the embodiments provided above or below, the peptide or salt thereof is one with at least 85% identity with a sequence SEQ ID NO: 9 to 16, wherein Rt, Ra and $R_{19}$ are the same or different and represent $(C_1-C_{10})$alkyl; $R_2$ is $(C_2-C_{10})$alkenyl; the C-terminal is selected from —C(O)OH and —CONH$_2$ and the N-terminal end is —NH$_2$.

In another embodiment of the first aspect of the invention, the peptide is one having at least 85% identity with an amino acid sequence, or pharmaceutical or cosmetical salt thereof, selected from the group consisting of sequence SEQ ID NO: 17 to 23:

$R_{19}$ are as defined in any of the above embodiments. In another embodiment of the first aspect of the invention, optionally in combination with any of the embodiments provided above or below, the peptide or salt thereof is a peptide which has an identity of 100% with respect to any of the sequences SEQ ID NO: 1 to 23, and "m", "n", "p", "q", "$m_x$", "$n_x$", "$p_x$", "$q_x$", L and Rig are as defined in any of the above embodiments. In one embodiment, optionally in combination with any of the embodiments provided above or below, the two aminoacidic residues connected by the

SEQ ID NO: 17

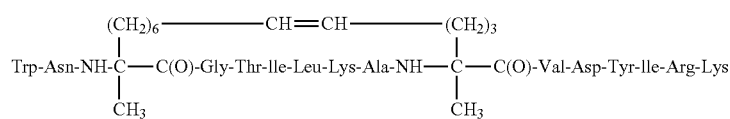

(hereinafter also referred "F22")

SEQ ID NO: 18

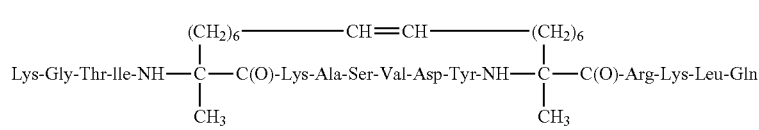

(hereinafter also referred "F29")

SEQ ID NO: 19

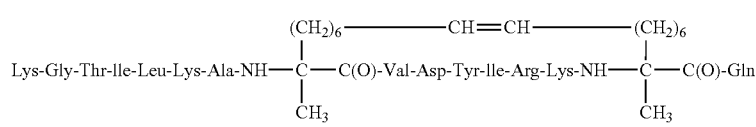

(hereinafter also referred "F31")

SED ID NO: 20

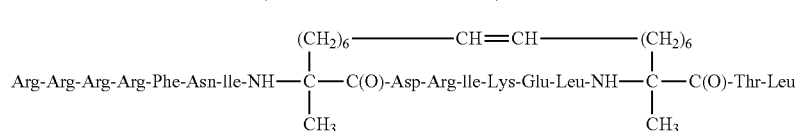

(hereinafter also referred "F05")

SEQ ID NO: 21

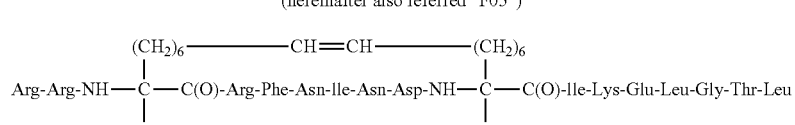

(hereinafter also referred "F13")

SEQ ID NO: 22

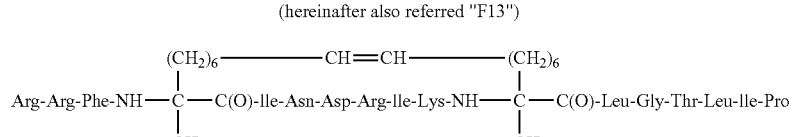

(hereinafter also referred "F16")

SEQ ID NO: 23

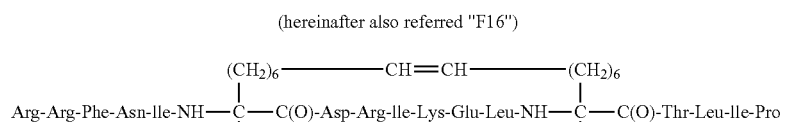

(hereinafter also referred "F18")

In another embodiment of the first aspect of the invention, optionally in combination with any of the embodiments provided above or below, the peptide or salt thereof is a peptide which has an identity of 85%, 86%, 87%, 88%, 89%, 90%, 91%, 92%, 93%, 94%, 95%, 96%, 97%, 98%, 99% or 100% with respect to any of the sequences SEQ ID NO: 1 to 23, and "m", "n", "p", "q", "$m_x$", "$n_x$", "$p_x$", "$q_x$", L and linker are not considered when performing the alignment to determine the identical positions for confirming the identity degree.

In one embodiment of the first aspect of the invention, optionally in combination with any of the embodiments provided above or below, the peptide of the first aspect is conjugated to a moiety, such as a label, a drug or a cell penetration peptide. In another embodiment of the first aspect of the invention, optionally in combination with any of the embodiments provided above or below, the peptide is conjugated to a label. In another embodiment of the first aspect of the invention, optionally in combination with any of the embodiments provided above or below, the label is conjugated to the N- or C-terminal of the peptide.

A "label" as used herein is a molecule or compound that can be detected by a variety of methods including fluorescence, electrical conductivity, radioactivity, size, and the like. The label may be intrinsically capable of emitting a signal, such as for example fluorescent label that emits light of a particular wavelength following excitation by light of another lower, characteristic wavelength. Alternatively, the label may not be capable of intrinsically emitting a signal but it may be capable of being bound by another compound that does emit a signal. An example of this latter situation is a label such as biotin which itself does not emit a signal but which when bound to labeled avidin or streptavidin molecules can be detected. Other examples of this latter kind of label are ligands that bind specifically to particular receptors. Detectably labeled receptors are allowed to bind to ligand labeled unit specific markers in order to visualize such markers.

Labels that may be used according to the invention include but are not limited to electron spin resonance molecule, a fluorescent molecule, a chemiluminescent molecule, a radioisotope, an enzyme substrate, an enzyme, a biotin molecule, an avidin molecule, an electrical charge transferring molecule, a semiconductor nanocrystal, a semiconductor nanoparticle, a colloid gold nanocrystal, a ligand, a microbead, a magnetic bead, a paramagnetic molecule, a quantum dot, a chromogenic substrate, an affinity molecule, a protein, a peptide, nucleic acid, a carbohydrate, a hapten, an antigen, an antibody, an antibody fragment, and a lipid.

Radioisotopes can be detected with film or charge coupled devices (CCDs), ligands can be detected by binding of a receptor having a fluorescent, chemiluminescent or enzyme tag, and microbeads can be detected using electron or atomic force microscopy.

The conjugation of the label to the peptide can be performed following routine protocols well-known for the skilled in the art.

In another embodiment, the peptide of the first aspect of the invention, optionally in combination with any of the embodiments provided above or below, is conjugated to a drug. In one embodiment, the drug is conjugated to the N-terminal end of the peptide.

In another embodiment of the first aspect of the invention, optionally in combination with any of the embodiments provided above or below, the peptide is conjugated to a cell penetrating peptide.

In present invention the term "cell penetrating peptide" ("CPP") refers to short peptides that facilitate cellular uptake of various molecular cargo (from nanosize particles to small chemical molecules and large fragments of DNA). The "cargo" is associated to peptides via the C(t) or N(t)-end, either through chemical linkage via covalent bonds or through non-covalent interactions. The function of the CPPs are to deliver the cargo into cells, a process that commonly occurs through endocytosis. Current use is limited by a lack of cell specificity in CPP-mediated cargo delivery and insufficient understanding of the modes of their uptake. CPPs typically have an amino acid composition that either contains a high relative abundance of positively charged amino acids such as lysine or arginine or has sequences that contain an alternating pattern of polar/charged amino acids and non-polar, hydrophobic amino acids. These two types of structures are referred to as polycationic or amphipathic, respectively. A third class of CPPs are the hydrophobic peptides, containing only apolar residues, with low net charge or have hydrophobic amino acid groups that are crucial for cellular uptake. The conjugation of the CPP to the peptide provided in the present invention can be performed following well-known routine protocols, such as solid phase synthesis or solution selective capping. (cf. Copolovici D. M. et al., "Cell-Penetrating Peptides: Design, Synthesis, and Applications", 2014, ACS Nano, 2014, 8 (3), pp 1972-1994). In another embodiment of the first aspect of the invention, optionally in combination with any of the embodiments provided above or below, the cell penetrating peptide is a polycationic CPP, polyArg or, alternatively, penetratine.

The process for the preparation of the peptides according to the first aspect of the invention comprises:

(1.a) the coupling, by condensation, of the corresponding amino acids of the peptide with a compound of formula (III) and a compound of formula (IV), which correspond to the amino acids referred as "i" and "i+4" or "i+7". Compounds (III) and (IV) will be those suffering a subsequent cyclization step to generate the "L" biradical:

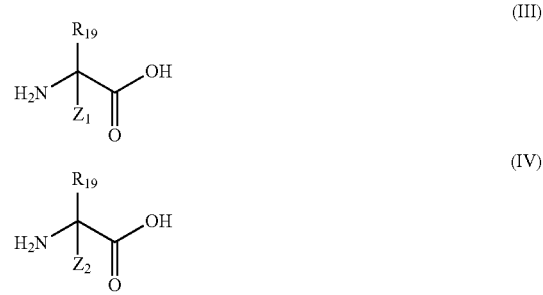

wherein $R_{19}$ is as defined above, $Z_1$ and $Z_2$ are the same or different and represent $(C_2$-$C_{10})$alkenyl; and (1.b) a cyclization step comprising the ring-closed metathesis of $Z_1$ and $Z_2$ (cf. Kim Young-Woo et al., "Synthesis of all-hydrocarbon stapled a-helical peptides by ring-closing olefin metathesis", Nature Protocols, 2011, 6(6), p. 761-771; Scott J. M. et al., "Application of Ring-Closing Metathesis to the Synthesis of Rigidified Amino Acids and Peptides", J. Am. Chem. Soc., 1996, v. 118 (40), pp 9606-9614) performed in solution with a Grubbs (I or II generation) catalyst; or, alternatively, (2a) the coupling, by condensation, of the required amino acids, including a compound of formula (V) and a compound of formula (VI), which correspond to the amino acids referred as "i" and "i+4" or "i+7". Compounds (V) and (VI) will be those suffering a subsequent cyclization step to generate the "L" biradical:

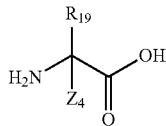

(VI)

wherein $R_{19}$ is as defined above, $Z_3$ and $Z_4$ are the same or different, selected from the group consisting of: halogen, —SH, —NHR$_{20}$, —OH, (C$_2$-C$_{10}$)alkyl-SH, (C$_1$-C$_{10}$)alkyl-OH, (C$_1$-C$_{10}$)alkyl-NHR$_{21}$, C(=O)OH, (C$_1$-C$_{10}$) C(=O)OH, C(=O)NHR$_2$, (C$_1$-C$_{10}$)alkylC(=O)NHR$_{23}$, OR$_{24}$, C(=O)-halogen, C(=O)—OR$_{25}$, S(=O)-halogen, S(=O)—OR$_{26}$, S(=O)$_2$R$_{27}$ where $R_{20}$, $R_{21}$, $R_{22}$, $R_{23}$, $R_{24}$, $R_{25}$, $R_{26}$ and $R_{27}$ are monoradicals selected from the group consisting of: hydrogen, (C$_1$-C$_{10}$)alkyl, (C$_2$-C$_{10}$)alkenyl, and (C$_2$-C$_{10}$)alkynyl; a known ring system comprising from 3 to 14 carbon atoms, the system comprising from 1 to 3 rings, where:
each one of the rings is saturated, partially unsaturated, or aromatic;
the rings are isolated, partially or totally fused,
each one of the members forming the known ring system is selected from the group consisting of: —CH—, —CH$_2$—, —NH—, —N—, —SH—, —S—, and —O—; and
the ring system is optionally substituted by one or more radicals independently selected from the group consisting of halogen, —OH, —NH$_2$, —SH, C(=O)-halogen (C$_1$-C$_{10}$)haloalkyl, and (C$_1$-C$_{10}$)alkyl-O—; and (2b) a cyclization step comprising the coupling reaction between $Z_3$ and $Z_4$ radicals; or, alternatively, (3a) the coupling, by condensation, of the corresponding amino acids of the peptide with a compound of formula (VII) and a compound of formula (VIII), which correspond to the amino acids referred as "i" and "i+4" or "i+7". Compounds (VII) and (VIII) will be those suffering a subsequent cyclization step to generate the "L" biradical:

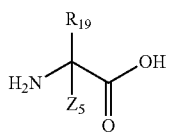

(VII)

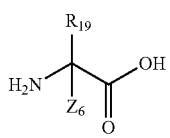

(VIII)

wherein $R_{19}$ is as defined above, one of $Z_5$ and $Z_6$ is (C$_2$-C$_{10}$)alkynyl and the other is (C$_2$-C$_{10}$)alkylN$_3$; and (3.b) a cyclization step comprising the condensation of $Z_5$ and $Z_6$ radicals by well-known protocols such as the Cu(I)-mediated Huisgen 1,3-dipolar cycloaddition reaction (a.k.a. a "click" reaction) to generate a 1,4-substituted 1,2,3-triazole bridge (cf. Kolb H. C. et al., "The growing impact of click chemistry on drug discovery", 2003, Drug Discov Today, 8 (24): 1128-1137).

The process for the preparation of the peptide according to the second aspect of the invention comprises the coupling, by condensation, of the carboxylic group or C-terminus of one amino acid with the amino group or N-terminus of another, this coupling reaction being repeated the number of times required until the desired peptide is obtained.

The compounds of formula (III), (IV), (V), (VI), (VII), and (VIII) are commercially available and are coupled by condensation to the already formed portion of peptide sequence. These compounds can carry beads for the appropriate solid phase synthesis of the peptide, as well as protecting groups of the carboxy, amino or side-chain. Illustrative non-limitative examples of compounds are: 2-(2'-propenyl) alanine, 2-(3'-butenyl)glycine, 2-(4'-pentenyl) alanine, 2-(6'-heptenyl) alanine, 2-(7'-octenyl) alanine, allyl-glycine, 5-azido-norvaline, and alpha-propargyl-alanine, among others.

The "coupling" step can be performed in solid phase, following the protocol "deprotection-wash-coupling-wash", by condensation of the carboxylic group of one amino acid with the amino group of another amino acid residue, using amino acids as defined above as well as alpha-alpha di-substituted amino acids of formula (II) to (VII).

The general principle of solid phase peptide synthesis is to repeat cycles of deprotection-wash-coupling-wash. The free N-terminal amine of a solid-phase attached peptide is coupled to a single N-protected amino acid unit. This unit is then deprotected, revealing a new N-terminal amine to which a further amino acid may be attached. Amino acids have reactive moieties at the N- and C-termini, which facilitates amino acid coupling during synthesis. Many amino acids also have reactive side chain functional groups, which can interact with free termini or other side chain groups during synthesis and peptide elongation and negatively influence yield and purity. To facilitate proper amino acid synthesis with minimal side chain reactivity, chemical groups have been developed to bind to specific amino acid functional groups and block, or protect, the functional group from nonspecific reactions. These protecting groups, while vast in nature, can be separated into three groups, as follows: N-terminal protecting groups, C-terminal protecting groups (mostly used in liquid-phase synthesis), and side chain protecting groups.

For coupling the peptides the carboxyl group is usually activated. This is important for speeding up the reaction. There are two main types of activating groups: carbodiimides and triazolols. However, the use of pentafluorophenyl esters (FDPP, PFPOH]) and BOP—Cl are useful for cyclising peptides.

Purified, individual amino acids are reacted with these protecting groups prior to synthesis and then selectively removed during specific steps of peptide synthesis.

Exemplary resins which may be employed by the present invention include, but are not limited to: (1) alkenyl resins (e.g., REM resin, vinyl sulfone polymer-bound resin, vinyl-polystyrene resin); (2) amine functionalized resins (e.g., amidine resin, N-(4-Benzyloxybenzyl) hydroxylamine polymer bound, (aminomethyl) polystyrene, polymer bound (R)-(+)-a-methylbenzylamine, 2-Chlorotrityl Knorr resin, 2-N-Fmoc-Amino-dibenzocyclohepta-1,4-diene, polymer-bound resin, 4-[4-(1-Fmoc-aminoethyl)-2-methoxy-5-nitrophenoxy]butyramidomethyl-polystyrene resin, 4-Benzyloxybenzylamine, polymer-bound, 4-Carboxybenzenesulfonamide, polymer-bound, Bis(tert-butoxycarbonyl) thiopseudourea, polymer-bound, Dimethylaminomethyl-polystyrene, Fmoc-3-amino-3-(2-nitrophenyl) propionic acid, polymer-bound, N-Methyl aminomethylated polystyrene, PAL resin, Sieber amide resin, tert-Butyl N-(2-mercaptoethyl) carbamate, polymer-bound, Triphenylchloromethane-4-carboxamide polymer bound); (3) benzhydrylamine (BHA) resins (e.g., 2-Chlorobenzhydryl chloride, polymer-bound, HMPB-benzhydrylamine polymer bound, 4-Methylbenzhydrol, polymer-bound, Benzhydryl chloride, polymer-bound, Benzhydrylamine polymer-bound); (4) Br-functionalized resins (e.g., 4-(Benzyloxy) benzyl bromide polymer bound, 4-Bromopolystyrene, Brominated PPOA resin, Brominated Wang resin, Bromoacetal, polymer-bound, Bromopolystyrene, HypoGel® 200 Br, Polystyrene A-Br for peptide synthesis, Selenium bromide, polymer-bound, TentaGel HL-Br, TentaGel MB-Br, TentaGel S—Br); (5) Chloromethyl resins (e.g., 5-[4-(Chloromethyl)phenyl]pentyl]styrene, polymer-bound, 4-(Benzyloxy) benzyl chloride polymer bound, 4-Methoxybenzhydryl chloride, polymer-bound); (6) CHO-functionalized resins (e.g., (4-Formyl-3-methoxyphenoxymethyl) polystyrene, (4-Formyl-3-methoxyphenoxymethyl) polystyrene, 3-Benzyloxybenzaldehyde, polymer-bound, 4-Benzyloxy-2,6-dimethoxybenzaldehyde, polymer-bound, Formylpolystyrene, HypoGel® 200 CHO, Indole resin, Polystyrene A-CH(OEt)2, TentaGel HL-CH(OEt)2); (7) Cl-functionalized resins (e.g., Benzoyl chloride polymer bound, (chloromethyl) polystyrene, Merrifield's resin); (8) $CO_2H$ functionalized resins (e.g., Carboxyethylpolystryrene, HypoGel® 200 COOH, Polystyrene AM-COOH, TentaGel HL-COOH, TentaGel MB-COOH, TentaGel S—COOH); (9) Hypo-Gel resins (e.g., HypoGel® 200 FMP, HypoGel® 200 PHB, HypoGel® 200 Trt-OH, HypoGel® 200 HMB); (10) I-functionalized resins (e.g., 4-Iodophenol, polymer-bound, Iodopolystyrene); Janda-Jels™ (JandaJel<ä>-Rink amide, JandaJel-$NH_2$, JandaJel-Cl, JandaJel-4-Mercaptophenol, JandaJel-OH, JandaJel-1-(3-Dimethylaminopropyl)-3-ethylcarbodiimide, JandaJel-1,3,4,6,7,8-hexahydro-2H-pyrimido-[1,2-a]pyrimidine, JandaJel-morpholine, JandaJel-polypyridine, JandaJel-Triphenylphosphine, JandaJel-Wang); (11) MBHA resins (3[4'-(Hydroxymethyl)phenoxy] propionic acid-4-methylbenzhydrylamine resin, 4-(Hydroxymethyl) phenoxyacetic acid polymer-bound to MBHA resin, HMBA-4-methylbenzhydrylamine polymer bound, 4-Methylbenzhydrylamine hydrochloride polymer bound Capacity (amine); (12) $NH_2$ functionalized resins ((Aminomethyl)polystyrene, (Aminomethyl)polystyrene, HypoGel® 200 $NH_2$, Polystyrene AM-NH2, Polystyrene Microspheres 2-aminoethylated, Polystyrol Microspheres 2-bromoethylated, Polystyrol Microspheres 2-hydroxyethylated, TentaGel HL-NH2, Tentagel M Br, Tentagel M $NH_2$, Tentagel M OH, TentaGel MB-NH2, TentaGel S—NH2, TentaGel S—NH2); (13) OH-functionalized resins (e.g., 4-hydroxymethylbenzoic acid, polymer-bound, Hydroxymethyl Resins, OH-functionalized Wang Resins); (14) oxime resins (e.g., 4-Chlorobenzophenone oxime polymer bound, Benzophenone oxime polymer bound, 4-Methoxybenzophenone oxime polymer bound); (15) PEG resins (e.g., ethylene glycol polymer bound); (16) Boc-/Blz peptide synthesis resins (e.g., Boc-Lys(Boc)-Lys[Boc-Lys(Boc)]-Cys(Acm)-b-Ala-O-PAM resin, Boc-Lys(Fmoc)-Lys[Boc-Lys(Fmoc)]-b-Ala-O-Pam resin, Boc-Lys(Boc)-Lys[Boc-Lys(Boc)]-Lys{Boc-Lys(Boc)-Lys[Boc-Lys(Boc)]}-b-Ala-O-PAM resin, Boc-Lys(Fmoc)-Lys[Boc-Lys(Fmoc)]-Lys[Boc-Lys(Fmoc)-Lys{Boc-Lys(Fmoc)]}-b-Ala-O-PAM resin, Boc-Lys(Boc)-Lys[Boc-Lys(Boc)]-Lys{Boc-Lys(Boc)-Lys[Boc-Lys(Boc)]}-Cys(Acm)-b-Ala-O-PAM resin, Preloaded PAM resins); (17) Fmoc-/t-Bu peptide synthesis resins (e.g., Fmoc-Lys(Fmoc)-Lys[Fmoc-Lys(Fmoc)]-b-Ala-O-Wang resin, Fmoc-Lys(Fmoc)-Lys[Fmoc-Lys(Fmoc)]-Lys(Fmoc-Lys(Fmoc)-Lys[Fmoc-Lys(Fmoc)]-b-Ala-O-Wang resin, Preloaded TentaGel® S Trityl Resins, Preloaded TentaGel® Resins, Preloaded Trityl Resins, Preloaded Wang Resins, Trityl Resins Preloaded with Amino Alcohols); (19) thiol-functionalized resins (e.g., HypoGel® 200 S-Trt, Polystyrene AM-S-Trityl, TentaGel HL-S-Trityl, TentaGel MB-S-Trityl, TentaGel S—S-Trityl); and (20) Wang resins (e.g., Fmoc-Ala-Wang resin, Fmoc-Arg(Pbf)-Wang resin, Fmoc-Arg(Pmc)-Wang resin, Fmoc-Asn(Trt)-Wang resin, Fmoc-Asp(OtBu)-Wang resin, Fmoc-Cys(Acm)-Wang resin, Fmoc-Cys(StBu)-Wang resin, Fmoc-Cys(Trt) Wang resin, Fmoc-Gln(Trt)-Wang resin, Fmoc-Glu(OtBu)-Wang resin, Fmoc-Gly-Wang resin, Fmoc-His(Trt)-Wang resin, Fmoc-Ile-Wang resin, Fmoc-Leu-Wang resin, Fmoc-Lys(Boc)-Wang resin, Fmoc-Met-Wang resin, Fmoc-D-Met-Wang resin, Fmoc-Phe-Wang resin, Fmoc-Pro-Wang resin, Fmoc-Ser(tBu)-Wang resin, Fmoc-Ser(Trt)-Wang resin, Fmoc-Thr(tBu)-Wang resin, Fmoc-Trp(Boc) Wang resin, Fmoc-Trp-Wang resin, Fmoc-Tyr(tBu)-Wang resin, Fmoc-Val-Wang resin).

"Protecting group" (PG) refers to a grouping of atoms that when attached to a reactive group in a molecule masks, reduces or prevents that reactivity.

Suitable amino-protecting groups include methyl carbamate, ethyl carbamante, 9-fluorenylmethyl carbamate (Fmoc), 9-(2-sulfo)fluorenylmethyl carbamate, 9-(2,7-dibromo)fluoroenylmethyl carbamate, 2,7-di-t-butyl-[9-(10,10-dioxo-10,10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromoethyl carbamate (DB-t-BOC), 1,1-dimethyl-2,2,2-trichloroethyl carbamate (TCBOC), 1-methyl-1-(4-biphenylyl)ethyl carbamate (Bpoc), 1-(3,5-di-t-butylphenyl)-1-methylethyl carbamate (t-Bumeoc), 2-(2'- and 4'-pyridyl)ethyl carbamate (Pyoc), 2-(N,N-dicyclohexylcarboxamido)ethyl carbamate, t-butyl carbamate (BOC), 1-adamantyl carbamate (Adoc), vinyl carbamate (Voc), allyl carbamate (Alloc), 1-isopropylallyl carbamate (Ipaoc), cinnamyl carbamate (Coc), 4-nitrocinnamyl carbamate (Noc), 8-quinolyl carbamate, N-hydroxypiperidinyl carbamate, alkyldithio carbamate, benzyl carbamate (Cbz), p-methoxybenzyl carbamate (Moz), p-nitobenzyl carbamate, p-bromobenzyl carbamate, p-chlorobenzyl carbamate, 2,4-dichlorobenzyl carbamate, 4-methylsulfinylbenzyl carbamate (Msz), 9-anthrylmethyl carbamate, diphenylmethyl carbamate, 2-methylthioethyl carbamate, 2-methylsulfonylethyl carbamate, 2-(p-toluenesulfonyl)ethyl carbamate, [2-(1,3-dithianyl)]methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, m-chloro-p-acyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenyl carbamate, 3,5-dimethoxybenzyl carbamate, o-nitrobenzyl carbamate, 3,4-dimethoxy-6-nitrobenzyl carbamate, phenyl(o-nitrophenyl)methyl carbamate, phenothiazinyl-(10)-carbonyl derivative, N'-p-toluenesulfonylaminocarbonyl derivative, N'-phenylaminothiocarbonyl derivative, t-amyl carbamate, S-benzyl thiocarbamate, p-cyanobenzyl carbamate, cyclobutyl carbamate, cyclohexyl carbamate, cyclopentyl carbamate, cyclopropylmethyl carbamate, p-decyloxybenzyl carbamate, 2,2-dimethoxycarbonylvinyl carbamate, o-(N,N-dimethylcarboxamido)benzyl carbamate, 1,1-dimethyl-3-(N,N-dimethylcarboxamido) propyl carbamate, 1,1-dimethylpropynyl carbamate, di(2-pyridyl)methyl carbamate, 2-furanylmethyl carbamate, 2-iodoethyl carbamate, isobornyl carbamate, isobutyl carbamate, isonicotinyl carbamate, p-(p'-methoxyphenylazo)benzyl carbamate, 1-methylcyclobutyl carbamate, 1-methylcyclohexyl carbamate, 1-methyl-1-cyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl)ethyl carbamate, phenyl carbamate, p-(phenylazo)benzyl carbamate, 2,4,6-tri-t-butylphenyl carbamate, 4-(trimethylammonium) benzyl carbamate, 2,4,6-trimethylbenzyl carbamate, formamide, acetamide, chloroacetamide, trichloroacetamide, trifluoroacetamide, phenylacetamide, 3-phenylpropanamide, picolinamide, 3-pyridylcarboxamide, N-benzoylphenylalanyl derivative, benzamide, p-phenylbenzamide, o-nitophenylacetamide, o-nitrophenoxyacetamide, acetoacetamide, (N'-dithiobenzyloxycarbonylamino) acetamide, 3-(p-hydroxyphenyl)propanamide, 3-(o-nitrophenyl)propanamide, 2-methyl-2-(o-nitrophenoxy)propanamide, 2-methyl-2-(o-phenylazophenoxy)propanamide, 4-chlorobutanamide, 3-methyl-3-nitrobutanamide, o-nitrocinnamide, N-acetylmethionine derivative, o-nitrobenzamide, o-(benzoyloxymethyl)benzamide, 4,5-diphenyl-3-oxazolin-2-one, N-phthalimide, N-dithiasuccinimide (Dts), N-2,3-diphenylmaleimide, N-2,5-dimethylpyrrole, N-1,1,4,4-tetramethyldisilylazacyclopentane adduct (STABASE), 5-substituted 1,3-dimethyl-1,3,5-triazacyclohexan-2-one, 5-substituted 1,3-dibenzyl-1,3,5-triazacyclohexan-2-one, 1-substituted 3,5-dinitro-4-pyridone, N-methylamine, N-allylamine, N-[2-trimethylsilyl)ethoxy]methylamine (SEM), N-3-acetoxypropylamine, N-(1-isopropyl-4-nitro-2-oxo-3-pyroolin-3-yl)amine, quaternary ammonium salts, N-benzylamine, N-di(4-methoxyphenyl)methylamine, N-5-dibenzosuberylamine, Ntriphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine, N-p-methoxybenzylideneamine, N-diphenylmethyleneamine, N-[(2-pyridyl)mesityl]methyleneamine, N—(N',N'-dimethylaminomethylene) amine, N,N'-isopropylidenediamine, N-p-nitrobenzylideneamine, N-salicylideneamine, N-5-chlorosalicylideneamine, N-(5-chloro-2-hydroxyphenyl)phenylmethyleneamine, N-cyclohexylideneamine, N-(5,5-dimethyl-3-oxo-1-cyclohexenyl)amine, N-borane derivative, N-diphenylborinic acid derivative, N-[phenyl (pentacarbonylchromium- or tungsten)carbonyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoramidate, benzenesulfenamide, o-nitrobenzenesulfenamide (Nps), 2,4-dinitrobenzenesulfenamide, pentachlorobenzenesulfenamide, 2-nitro-4-methoxybenzenesulfenamide, triphenylmethylsulfenamide, 3-nitropyridinesulfenamide (Npys), p-toluenesulfonamide (Ts), benzenesulfonamide, 2,3,6-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), 3-trimethylsilylethanesulfonamide (SES), 9-anthracenesulfonamide, 4-(4',8'-dimethoxynaphthylmethyl)benzenesulfonamide (DNMBS), benzylsulfonamide, trifluoromethylsulfonamide, and phenacylsulfonamide.

Examples of suitably protected carboxylic acids further include, but are not limited to, silyl-, alkyl-, alkenyl-, aryl-, and arylalkyl-protected carboxylic acids. Examples of suitable silyl groups include trimethylsilyl, triethylsilyl, t-butyldimethylsilyl, t-butyldiphenylsilyl, triisopropylsilyl, and the like. Examples of suitable alkyl groups include methyl, benzyl, p-methoxybenzyl, 3,4-dimethoxybenzyl, trityl, t-butyl, tetrahydropyran-2-yl. Examples of suitable alkenyl groups include allyl. Examples of suitable aryl groups include optionally substituted phenyl, biphenyl, or naphthyl. Examples of suitable arylalkyl groups include optionally substituted benzyl (e.g., p-methoxybenzyl (MPM), 3,4-dimethoxybenzyl, O-nitrobenzyl, p-nitrobenzyl, p-halobenzyl, 2,6-dichlorobenzyl, p-cyanobenzyl), and 2- and 4-picolyl.

In second aspect the present invention provides a pharmaceutical or cosmetical composition.

The expression "therapeutically effective amount" as used herein, refers to the amount of a compound that, when administered passes to blood stream and is sufficient to prevent development of, or alleviate to some extent, one or more of the symptoms of the disease which is addressed. The particular dose of the peptide administered according to this invention will of course be determined by the particular circumstances surrounding the case, including the compound administered, the route of administration, the particular condition being treated, and the similar considerations. In one embodiment of the second aspect of the invention, the pharmaceutical composition is a parenteral composition. In another embodiment, the pharmaceutical composition is for oral administration.

The expression "cosmetically effective amount", in the context of the present invention, refers to the amount of a compound that when it is applied (for example topically) is retained within the skin tissue (such as at subcutaneous level), without significantly reaching, or not reaching, the blood stream, thus exerting a local effect within skin structure. The particular dose of the peptide administered according to this invention will of course be determined by the particular circumstances surrounding the case. In one embodiment of the invention, the "cosmetically effective amount" of the peptide of the invention is higher, equal or lower than the amount needed to achieve a therapeutic effect when it is administered by parenteral route, particularly by intravenous route.

The term "pharmaceutically acceptable" refers to that excipients or carriers suitable for use in the pharmaceutical technology for preparing compositions with medical use.

The term "cosmetically acceptable" which is herein used interchangeably refers to that excipients or carriers suitable for use in contact with human skin without undue toxicity, incompatibility, instability, allergic response, among others.

The expression "excipients and/or carriers" refers to acceptable materials, compositions or vehicles. Each component must be pharmaceutically or cosmetically acceptable in the sense of being compatible with the other ingredients of the composition. It must also be suitable for use in contact with the tissue or organ of humans and non-human animals without excessive toxicity, irritation, allergic response, immunogenicity or other problems or complications commensurate with a reasonable benefit/risk ratio. Examples of suitable acceptable excipients are solvents, dispersion media, diluents, or other liquid vehicles, dispersion or suspension aids, surface active agents, isotonic agents, thickening or emulsifying agents, preservatives, solid binders, lubricants and the like. Except insofar as any conventional excipient medium is incompatible with a substance or its derivatives, such as by producing any undesirable biological effect or otherwise interacting in a deleterious manner with any other component(s) of the pharmaceutical or cosmetical composition, its use is contemplated to be within the scope of this invention.

The formulations of the pharmaceutical and cosmetical compositions described herein may be prepared by any method known or hereafter developed in the art of pharmacology and cosmetics. In general, such preparatory methods include the step of bringing the active ingredient (the peptide) into association with a excipient and/or one or more other accessory ingredients, and then, if necessary and/or desirable, shaping and/or packaging the product into a desired single- or multi-dose unit.

A pharmaceutical composition of the invention may be prepared, packaged, and/or sold in bulk, as a single unit dose, and/or as a plurality of single unit doses. As used herein, a "unit dose" is discrete amount of the pharmaceutical composition comprising a predetermined amount of the active ingredient.

The relative amounts of the active ingredient (i.e., the peptide as defined in any of the previous aspects and embodiments), the acceptable excipients, and/or any additional ingredients in the composition of the invention will vary, depending upon the identity, size, and/or condition of the subject treated and further depending upon the route by which the composition is to be administered.

Acceptable excipients used in the manufacture of these compositions include, but are not limited to, inert diluents, dispersing and/or granulating agents, surface active agents and/or emulsifiers, disintegrating agents, binding agents, preservatives, buffering agents, lubricating agents, and/or oils. Such excipients may optionally be included in the inventive formulations. Excipients such as cocoa butter and suppository waxes, coloring agents, coating agents, sweetening, flavoring, and perfuming agents can be present in the composition, according to the judgment of the formulator.

Exemplary diluents include, but are not limited to, calcium carbonate, sodium carbonate, calcium phosphate, dicalcium phosphate, calcium sulfate, calcium hydrogen phosphate, sodium phosphate lactose, sucrose, cellulose, microcrystalline cellulose, kaolin, mannitol, sorbitol, inositol, sodium chloride, dry starch, cornstarch, powdered sugar, and combinations thereof.

Exemplary granulating and/or dispersing agents include, but are not limited to, potato starch, corn starch, tapioca starch, sodium starch glycolate, clays, alginic acid, guar gum, citrus pulp, agar, bentonite, cellulose and wood products, natural sponge, cation-exchange resins, calcium carbonate, silicates, sodium carbonate, cross-linked polyvinylpyrrolidone) (crospovidone), sodium carboxymethyl starch (sodium starch glycolate), carboxymethyl cellulose, cross-linked sodium carboxymethyl cellulose (croscarmellose), methylcellulose, pregelatinized starch (starch 1500), microcrystalline starch, water insoluble starch, calcium carboxymethyl cellulose, magnesium aluminum silicate (Veegum), sodium lauryl sulfate, quaternary ammonium compounds, and combinations thereof.

Exemplary surface active agents and/or emulsifiers include, but are not limited to, natural emulsifiers (e.g. acacia, agar, alginic acid, sodium alginate, tragacanth, chondrux, cholesterol, xanthan, pectin, gelatin, egg yolk, casein, wool fat, cholesterol, wax, and lecithin), colloidal clays (e.g. bentonite [aluminum silicate] and Veegum [magnesium aluminum silicate]), long chain amino acid derivatives, high molecular weight alcohols (e.g. stearyl alcohol, cetyl alcohol, oleyl alcohol, triacetin monostearate, ethylene glycol distearate, glyceryl monostearate, and propylene glycol monostearate, polyvinyl alcohol), carbomers (e.g., carboxy polymethylene, polyacrylic acid, acrylic acid polymer, and carboxyvinyl polymer), carrageenan, cellulosic derivatives (e.g., carboxymethylcellulose sodium, powdered cellulose, hydroxymethyl cellulose, hydroxypropyl cellulose, hydroxypropyl methylcellulose, methylcellulose), sorbitan fatty acid esters {e.g., polyoxyethylene sorbitan monolaurate [Tween 20], polyoxyethylene sorbitan [Tween 60], polyoxyethylene sorbitan monooleate [Tween 80], sorbitan monopalmitate [Span 40], sorbitan monostearate [Span 60], sorbitan tristearate [Span 65], glyceryl monooleate, sorbitan monooleate [Span 80]), polyoxyethylene esters (e.g., polyoxyethylene monostearate [Myrj 45], polyoxyethylene hydrogenated castor oil, polyethoxylated castor oil, polyoxymethylene stearate, and Solutol), sucrose fatty acid esters, polyethylene glycol fatty acid esters (e.g., Cremophor), polyoxyethylene ethers, (e.g., polyoxyethylene lauryl ether [Brij 30]), poly(vinyl-pyrrolidone), diethylene glycol monolaurate, triethanolamine oleate, sodium oleate, potassium oleate, ethyl oleate, oleic acid, ethyl laurate, sodium lauryl sulfate, Pluronic F 68, Poloxamer 188, cetrimonium bromide, cetylpyridinium chloride, benzalkonium chloride, docusate sodium, etc. and/or combinations thereof.

Exemplary binding agents include, but are not limited to, starch (e.g., cornstarch and starch paste); gelatin; sugars (e.g., sucrose, glucose, dextrose, dextrin, molasses, lactose, lactitol, mannitol); natural and synthetic gums (e.g., acacia, sodium alginate, extract of Irish moss, panwar gum, ghatti gum, mucilage of isapol husks, carboxymethylcellulose, methylcellulose, ethylcellulose, hydroxyethylcellulose, hydroxypropyl cellulose, hydroxypropyl methylcellulose, microcrystalline cellulose, cellulose acetate, polyvinylpyrrolidone), magnesium aluminum silicate (Veegum), and larch arabogalactan); alginates; polyethylene oxide; polyethylene glycol; inorganic calcium salts; silicic acid; polymethacrylates; waxes; water; alcohol; and combinations thereof.

Exemplary preservatives may include antioxidants, chelating agents, antimicrobial preservatives, antifungal preservatives, alcohol preservatives, acidic preservatives, and other preservatives. Exemplary antioxidants include, but are not limited to, alpha tocopherol, ascorbic acid, acorbyl palmitate, butylated hydroxyanisole, butylated hydroxytoluene, monothioglycerol, potassium metabisulfite, propionic acid, propyl gallate, sodium ascorbate, sodium bisulfite, sodium metabisulfite, and sodium sulfite. Exemplary chelating agents include ethylenediaminetetraacetic acid (EDTA), citric acid monohydrate, disodium edetate, dipotassium edetate, edetic acid, fumaric acid, malic acid, phosphoric acid, sodium edetate, tartaric acid, and trisodium edetate. Exemplary antimicrobial preservatives include, but are not limited to, benzalkonium chloride, benzethonium chloride, benzyl alcohol, bronopol, cetrimide, cetylpyridinium chloride, chlorhexidine, chlorobutanol, chlorocresol, chloroxylenol, cresol, ethyl alcohol, glycerin, hexetidine, imidurea, phenol, phenoxyethanol, phenylethyl alcohol, phenylmercuric nitrate, propylene glycol, and thimerosal. Exemplary antifungal preservatives include, but are not limited to, butyl paraben, methyl paraben, ethyl paraben, propyl paraben, benzoic acid, hydroxybenzoic acid, potassium benzoate, potassium sorbate, sodium benzoate, sodium propionate, and sorbic acid. Exemplary alcohol preservatives include, but are not limited to, ethanol, polyethylene glycol, phenol, phenolic compounds, bisphenol, chlorobutanol, hydroxybenzoate, and phenylethyl alcohol. Exemplary acidic preservatives include, but are not limited to, vitamin A, vitamin C, vitamin E, beta-carotene, citric acid, acetic acid, dehydroacetic acid, ascorbic acid, sorbic acid, and phytic acid. Other preservatives include, but are not limited to, tocopherol, tocopherol acetate, deteroxime mesylate, cetrimide, butylated hydroxyanisol (BHA), butylated hydroxytoluened (BHT), ethylenediamine, sodium lauryl sulfate (SLS), sodium lauryl ether sulfate (SLES), sodium bisulfite, sodium metabisulfite, potassium sulfite, potassium metabisulfite, Glydant Plus, Phenonip, methylparaben, Germall 115, Germaben II, Neolone, Kathon, and Euxyl. In certain embodiments, the preservative is an anti-oxidant. In other embodiments, the preservative is a chelating agent.

Exemplary buffering agents include, but are not limited to, citrate buffer solutions, acetate buffer solutions, phosphate buffer solutions, ammonium chloride, calcium carbonate, calcium chloride, calcium citrate, calcium glubionate, calcium gluceptate, calcium gluconate, D-gluconic acid, calcium glycerophosphate, calcium lactate, propanoic acid, calcium levulinate, pentanoic acid, dibasic calcium phosphate, phosphoric acid, tribasic calcium phosphate, calcium hydroxide phosphate, potassium acetate, potassium chloride, potassium gluconate, potassium mixtures, dibasic potassium phosphate, monobasic potassium phosphate, potassium phosphate mixtures, sodium acetate, sodium bicarbonate, sodium chloride, sodium citrate, sodium lactate, dibasic sodium phosphate, monobasic sodium phosphate, sodium phosphate mixtures, tromethamine, magnesium hydroxide, aluminum hydroxide, alginic acid, pyrogen-free water, isotonic saline, Ringer's solution, ethyl alcohol, and combinations thereof.

Exemplary lubricating agents include, but are not limited to, magnesium stearate, calcium stearate, stearic acid, silica, talc, malt, glyceryl behanate, hydrogenated vegetable oils, polyethylene glycol, sodium benzoate, sodium acetate, sodium chloride, leucine, magnesium lauryl sulfate, sodium lauryl sulfate, and combinations thereof.

Exemplary oils include, but are not limited to, almond, apricot kernel, avocado, babassu, bergamot, black current seed, borage, cade, camomile, canola, caraway, carnauba, castor, cinnamon, cocoa butter, coconut, cod liver, coffee, corn, cotton seed, emu, eucalyptus, evening primrose, fish, flaxseed, geraniol, gourd, grape seed, hazel nut, hyssop, isopropyl myristate, jojoba, kukui nut, lavandin, lavender, lemon, *Litsea cubeba*, macadamia nut, mallow, mango seed, meadowfoam seed, mink, nutmeg, olive, orange, orange roughy, palm, palm kernel, peach kernel, peanut, poppy seed, pumpkin seed, rapeseed, rice bran, rosemary, safflower, sandalwood, sasquana, savoury, sea buckthorn, sesame, shea butter, silicone, soybean, sunflower, tea tree, thistle, tsubaki, vetiver, walnut, and wheat germ oils. Exemplary oils include, but are not limited to, butyl stearate, caprylic triglyceride, capric triglyceride, cyclomethicone, diethyl sebacate, dimethicone 360, isopropyl myristate, mineral oil, octyldodecanol, oleyl alcohol, silicone oil, and combinations thereof.

Liquid dosage forms for parenteral administration include, but are not limited to, pharmaceutically acceptable liposomes emulsions, microemulsions, solutions, suspensions, syrups and elixirs. In addition to the active ingredients, the liquid dosage forms may comprise inert diluents commonly used in the art such as, for example, water or other solvents, solubilizing agents and emulsifiers such as ethyl alcohol, isopropyl alcohol, ethyl carbonate, ethyl acetate, benzyl alcohol, benzyl benzoate, propylene glycol, 1,3-butylene glycol, dimethylformamide, oils (in particular, cottonseed, groundnut, corn, germ, olive, castor, and sesame oils), glycerol, tetrahydrofurfuryl alcohol, polyethylene glycols and fatty acid esters of sorbitan, and mixtures thereof. In certain embodiments for parenteral administration, the conjugates of the invention are mixed with solubilizing agents such as polyethoxylated castor oil (e.g. CREMOPHOR™), alcohols, oils, modified oils, glycols, polysorbates, cyclodextrins, polymers, and combinations thereof.

Injectable preparations, for example, sterile injectable aqueous or oleaginous suspensions may be formulated according to the known art using suitable dispersing or wetting agents and suspending agents. The sterile injectable preparation may be a sterile injectable solution, suspension or emulsion in a nontoxic parenterally acceptable diluent or solvent, for example, as a solution in 1,3-butanediol. Among the acceptable vehicles and solvents that may be employed are water, Ringer's solution, U.S.P. and isotonic sodium chloride solution. In addition, sterile, fixed oils are conventionally employed as a solvent or suspending medium. For this purpose any bland fixed oil can be employed including synthetic mono- or diglycerides. In addition, fatty acids such as oleic acid are used in the preparation of injectables. Alternatively, the preparation can be in the form of liposomes.

The injectable formulations can be sterilized, for example, by filtration through a bacterial-retaining filter, or by incorporating sterilizing agents in the form of sterile solid compositions which can be dissolved or dispersed in sterile water or other sterile injectable medium prior to use.

In order to prolong the effect of a drug, it is often desirable to slow the absorption of the drug from subcutaneous or intramuscular injection. This may be accomplished by the use of a liquid suspension of crystalline or amorphous material with poor water solubility. The rate of absorption of the drug then depends upon its rate of dissolution which, in turn, may depend upon crystal size and crystalline form. Alternatively, delayed absorption of a parenterally administered drug form is accomplished by dissolving or suspending the drug in an oil vehicle.

The peptides of the invention can be in micro-encapsulated form with one or more excipients as noted above. In one embodiment, the peptides of the invention are formulated in liposomes.

It will be appreciated that peptides and pharmaceutical compositions of the present invention can be employed in combination therapies. The particular combination of therapies (therapeutics or procedures) to employ in a combination regimen will take into account compatibility of the desired therapeutics and/or procedures and the desired therapeutic effect to be achieved. It will be appreciated that the therapies employed may achieve a desired effect for the same purpose (for example, an inventive conjugate useful for detecting tumors may be administered concurrently with another agent useful for detecting tumors), or they may achieve different effects (e.g., control of any adverse effects).

The pharmaceutical composition of the present invention may be administered either alone or in combination with one or more other therapeutic agents. By "in combination with," it is not intended to imply that the agents must be administered at the same time and/or formulated for delivery together, although these methods of delivery are within the scope of the invention. The compositions can be administered concurrently with, prior to, or subsequent to, one or more other desired therapeutics or medical procedures. In general, each agent will be administered at a dose and/or on a time schedule determined for that agent. Additionally, the invention encompasses the delivery of the peptide or pharmaceutical compositions in combination with agents that may improve their bioavailability, reduce and/or modify their metabolism, inhibit their excretion, and/or modify their distribution within the body.

The particular combination of therapies to employ in a combination regimen will take into account compatibility of the desired therapeutics and/or procedures and/or the desired therapeutic effect to be achieved. It will be appreciated that the therapies employed may achieve a desired effect for the same disorder (for example, a peptide of the invention may be administered concurrently with another biologically active agent used to treat the same disorder), and/or they may achieve different effects (e.g., control of any adverse effects). In will further be appreciated that biologically active agents utilized in this combination may be administered together in a single composition or administered separately in different compositions.

The expression "in combination with" also encompasses the possibility of conjugating (by chemical-physical interactions) the peptide of the invention to any of the further agents mentioned above and below, which can be either a therapeutic agent or an agent for improving the profile of the peptide (such as bioavailability), among others.

In one embodiment, the peptides of the invention are administered in combination with one or more anti-cancer agents. An anti-cancer agent may be, for instance, methotrexate, vincristine, adriamycin, cisplatin, non-sugar containing chloroethylnitrosoureas, 5-fluorouracil, mitomycin C, bleomycin, doxorubicin, dacarbazine, taxol, fragyline, Meglamine GLA, valrubicin, carmustaine and poliferposan, MMI270, BAY 12-9566, RAS farnesyl transferase inhibitor, farnesyl transferase inhibitor, MMP, MTA/LY231514, LY264618/Lometexol, Glamolec, CI-994, TNP-470, Hycamtin/Topotecan, PKC412, Valspodar/PSC833, Novantrone/Mitroxantrone, Metaret/Suramin, Batimastat, E7070, BCH-4556, CS-682, 9-AC, AG3340, AG3433, Incel/VX-710, VX-853, ZD0101, ISI641, ODN 698, TA 2516/Marmistat, BB2516/Marmistat, CDP 845, D2163, PD183805, DX895 if, Lemonal DP 2202, FK 317, Picibanil/OK-432, AD 32/Valrubicin, Metastron/strontium derivative, Temodal/Temozolomide, Evacet/liposomal doxorubicin, Yewtaxan/Paclitaxel, Taxol/Paclitaxel, Xeload/Capecitabine, Furtulon/Doxifluridine, Cyclopax/oral paclitaxel, Oral Taxoid, SPU-077/Cisplatin, HMR 1275/Flavopiridol, CP-358 (774)/EGFR, CP-609 (754)/RAS oncogene inhibitor, BMS-182751/oral platinum, UFT (Tegafur/Uracil), Ergamisol/Levamisole, Eniluracil/776C85/5FU enhancer, Campto/Levamisole, Camptosar/Irinotecan, Tumodex/Ralitrexed, Leustatin/Cladribine, Paxex/Paclitaxel, Doxil/liposomal doxorubicin, Caelyx/liposomal doxorubicin, Fludara/Fludarabine, Pharmarubicin/Epirubicin, DepoCyt, ZD1839, LU 79553/Bis-Naphtalimide, LU 103793/Dolastain, Caetyx/liposomal doxorubicin, Gemzar/Gemcitabine, ZD 0473/Anormed, YM 116, iodine seeds, CDK4 and CDK2 inhibitors, PARP inhibitors, D4809/Dexifosamide, Ifes/Mesnex/Ifosamide, Vumon/Teniposide, Paraplatin/Carboplatin, Plantinol/cisplatin, Vepeside/Etoposide, ZD 9331, Taxotere/Docetaxel, prodrug of guanine arabinoside, Taxane Analog, nitrosoureas, alkylating agents such as melphelan and cyclophosphamide, Aminoglutethimide, Asparaginase, Busulfan, Carboplatin, Chlorombucil, Cytarabine HCl, Dactinomycin, Daunorubicin HCl, Estramustine phosphate sodium, Etoposide (VP16-213), Floxuridine, Fluorouracil (5-FU), Flutamide, Hydroxyurea (hydroxycarbamide), Ifosfamide, Interferon Alfa-2a, Alfa-2b, Leuprolide acetate (LHRH-releasing factor analogue), Lomustine (CCNU), Mechlorethamine HCl (nitrogen mustard), Mercaptopurine, Mesna, Mitotane (o,p-DDD), Mitoxantrone HCl, Octreotide, Plicamycin, Procarbazine HCl, Streptozocin, Tamoxifen citrate, Thioguanine, Thiotepa, Vinblastine sulfate, Amsacrine (m-AMSA), Azacitidine, Erthropoietin, Hexamethylmelamine (HMM), Interleukin 2, Mitoguazone (methyl-GAG; methyl glyoxal bis-guanylhydrazone; MGBG), Pentostatin (2'-deoxycoformycin), Semustine (methyl-CCNU), Teniposide (VM-26) or Vindesine sulfate, signal transduction inhibitors (such as MEK, BRAF, AKT, her2, mTOR, and PI3K inhibitors), but it is not so limited.

As it is illustrated below, the peptides of the first aspect of the invention are useful in the therapeutic treatment of melanoma, particularly metastatic melanoma by reducing the proliferation of malignant melanocytes. In one embodiment, optionally in combination with any of the embodiments provided above or below, when the peptide or pharmaceutical composition is used with a therapeutic purpose, it is orally or parenterally administered.

The present invention also provides the non-therapeutic use of the peptide or cosmetical salt thereof for regulating melanogenesis, particularly for reducing or increasing the production of melanin. All the embodiments provided above regarding the peptide and cosmetical composition are also embodiments of this aspect. In one embodiment, optionally in combination with any of the embodiments provided above or below, the peptide is for use in the treatment of hyperpigmentation (by reducing the amount of melanin) or hypopigmentation (by increasing the amount of melanin). In another embodiment of the non-therapeutic use, optionally in combination with any of the embodiments provided above or below, it is regulated the melanogenesis in skin or hair, particularly in skin. In another embodiment, optionally in combination with any of the embodiments provided above or below, the subject does not suffer skin cancer. In one embodiment, optionally in combination with any of the embodiments provided above or below, when the peptide or cosmetical composition is used with a non-therapeutic/cosmetic purpose, it is topically administered.

The present invention also provides a cosmetical method for the treatment of the hyper or hypopigmentation comprising the application of the peptide or cosmetical salt thereof as defined in the first aspect or the cosmetical composition as defined in the second aspect of the invention. This cosmetic method does not encompass the therapeutic method. All the embodiments provided above regarding the peptide and cosmetic composition are also embodiments of this aspect. In one embodiment of the cosmetical method, optionally in combination with any of the embodiments provided above or below, the peptide or cosmetical composition is applied on skin and/or hair. In one embodiment of the cosmetical method, optionally in combination with any of the embodiments provided above or below, the peptide or cosmetical composition is applied on skin.

The present invention also provides a pigmenting composition, such as a topical cosmetical or pharmaceutical pigmenting composition, comprising the peptide or salt thereof as defined in any of embodiments provided above.

The invention also provides a depigmenting composition, such as a topical cosmetical or pharmaceutical depigmenting composition, comprising the peptide or salt thereof as defined in any of the embodiments provided above.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples are provided by way of illustration, and they are not intended to be limiting of the present invention. Furthermore, the present invention covers all possible combinations of particular and preferred embodiments described herein.

EXAMPLES

1. Materials and Methods
Synthetic General Procedure
Compounds IDP-F

Materials were purchased as following: Fmoc-protected α-amino acids ( - - - ); Rinkamide MBHA Resin (Tianjin Nankai HECHENG S&T Co., Ltd); HBTU ((2-(1H-benzotriazol-1-yl)-1,1,3,3-tetramethyluronium hexafluorophosphate), GL Biochem); N-methyl morpholine (Sinopharm Chemical Reagent Co., Ltd.); Succinic anhydride (Aladdin); acetonitrile (Xingke Chemical); ninhydrin (Sinopharm Chemical Reagent Co., Ltd.); Piperidine (Vertellus); Dimethylformamide, DMF (Zhejiang jiangshan chemical co., Ltd); trifluoroacetic acid, TFA (Trifluoroacetic acid, Solvay), TIS (Thioanisole, Solvay)

Briefly, the linear polypeptides were synthesized manually using Fmoc based SPPS (solid phase peptides synthesis) on Rink amide MBHA resin as support.

The following protocol was used:
1. The Fmoc protective group was removed with 20% piperidine in DMF.
2. The resin was washed with DMF five times.
3. The subsequent Fmoc-protected amino acid was coupled for 45 min using Fmoc-AA (3 equiv.), HBTU (3 equiv.), and N-methyl morpholine (6 equiv.).
4. The resin was washed with DMF five times. Coupling was checked by ninhydrin test.
5. Repeat from step 1.
6. N-terminal was capped by reacting with succinic anhydride (10 equiv.) and N-methyl morpholine (10 equiv.).

The peptide was cleaved from the resin and deprotected by exposure to solution F (95% TFA, 2.5% water, 2.5% TIS) and lyophilized.

The lyophilized peptides were purified by reverse phase HPLC using a C18 column (see compounds characterization for details). The peptides were identified by LC-MS-ESI. All the mass spectral data for all the compounds are shown below in Table 1.

Materials were purchased as following: Fmoc-protected α-amino acids (include than the olefinic amino acids Fmoc-[(S)-2-(4 pentenyl)alanine]OH, Fmoc-[(R)-2-(4 pentenyl)alanine]OH, Fmoc-[(S)-2-(7 octenyl)alanine]OH, Fmoc-[(R)-2-(4 pentenyl)alanine]OH, 2-(6-chloro-1-H-benzotriazole-1-yl)-1,1,3,3-tetramethylaminium hexafluorophosphate (TBTU), resins, dimethylformamide (DMF), N,N-diisopropylethylamine (DIEA), trifluoroacetic acid (TFA), 1,2-dichloroethane (DCE), Grubbs Ru(IV) catalyst and piperidine were purchased from different suppliers.

Briefly, the linear polypeptides were synthesized with automatic synthesizer using Fmoc solid phase peptide chemistry. Only the coupling with olefinic amino acids was performed manually after removing the resins from the reactor vessel, as disclosed in the previous section.

The ring-closing metathesis reaction was performed in solution with a first generation Grubbs catalyst after cleaving the linear peptide from the resin, as disclosed by Scott J. M. and colleagues (Scott J. M. et al., "Application of Ring-Closing Metathesis to the Synthesis of Rigidified Amino Acids and Peptides", 1996, J. Am. Chem. Soc., 1996, 118 (40), pp 9606-9614).

The deprotected peptide precipitated with methyl-tert-butyl ether at 4° C. and lyophilized.

The lyophilized peptides were purified by reverse phase HPLC using a $C_{18}$ column (see compounds characterization for details). The peptides were identified by LC-MS-ESI. All the mass spectral data for all the compounds are shown below in Table 1.

HPLC Conditions:
  IDP-F05. The compound was purified by HPLC-RP (C-18 column; Pump A: $H_2O$ with 0.1% TFA; Pump B Acetonitrile with 0.1% TFA) using a linear gradient 30%-40% of B in 20 minutes (R. T.=10.2). Purity grade 95.06% by HPLC;
  IDP-F13. The compound was purified by HPLC-RP (C-18 column; Pump A: $H_2O$ with 0.1% TFA; Pump B Acetonitrile with 0.1% TFA) using a linear gradient 32%-42% of B in 20 minutes (R. T.=14.26). Purity grade 97.5% by HPLC;
  IDP-F16. The compound was purified by HPLC-RP (C-18 column; Pump A: $H_2O$ with 0.1% TFA; Pump B Acetonitrile with 0.1% TFA) using a linear gradient 35%-45% of B in 20 minutes (R. T.=7.30). Purity grade 95.7% by HPLC;
  IDP-F18. The compound was purified by HPLC-RP (C-18 column; Pump A: $H_2O$ with 0.1% TFA; Pump B Acetonitrile with 0.1% TFA) using a linear gradient 51%-61% of B in 20 minutes (R. T.=10.97-11.97). Purity grade 95.6% by HPLC;
  IDP-F22. The compound was purified by HPLC-RP (C-18 column; Pump A: $H_2O$ with 0.1% TFA; Pump B Acetonitrile with 0.1% TFA) using a linear gradient 53%-63% of B in 20 minutes (R. T.=10.1-11.36). Purity grade 97.06% by HPLC;
  IDP-F29. The compound was purified by HPLC-RP (C-18 column; Pump A: $H_2O$ with 0.1% TFA; Pump B Acetonitrile with 0.1% TFA) using a linear gradient 30%-40% of B in 20 minutes (R. T.=8.91). Purity grade ≤50% by HPLC;
  IDP-F31. The compound was purified by HPLC-RP (C-18 column; Pump A: $H_2O$ with 0.1% TFA; Pump B Acetonitrile with 0.1% TFA) using a linear gradient 38%-48% of B in 20 minutes (R. T.=10.65). Purity grade 95.49% by HPLC;

TABLE 1

| | | | mass characterization | | | | |
|---|---|---|---|---|---|---|---|
| SEQ ID NO: | Sequence | | MW (1H) | Mass (2H) | Mass (3H) | Mass (4H) | Mass (5H) |
| 20 | RRRRFNIXDRIKELXTL | calcul. | 2277.51 | | | | |
| | | found | | 1139.7 | | | |
| 21 | RRXRFNINDXIKELGTL | calcul. | 2136.52 | | | | |
| | | found | | 1068.6 | 712.8 | 534.5 | |

TABLE 1-continued

| | | mass characterization | | | | | |
|---|---|---|---|---|---|---|---|
| SEQ ID NO: | Sequence | | MW (1H) | Mass (2H) | Mass (3H) | Mass (4H) | Mass (5H) |
| 22 | RRFXINDRIKXLGTLIP | calcul. found | 2103.58 | 1052.2 | 701.9 | 526.9 | |
| 23 | RRFNIXDRIKELXTLIP | calcul. found | 2175.65 | 1088.2 | 725.9 | | |
| 17 | WNXGTILKAXVDYIRK | calcul. found | 1968.37 | 984.7 | 656.9 | 493 | |
| 18 | KGTIXKASVDYXRKLQ | calcul. found | 1898.27 | 949.5 | 633.5 | | |
| 19 | KGTILKAXVDYIRKXQ | calcul. found | 1924.36 | 962.5 | 642.2 | 481.9 | |

The X biradical represents, the compound of formula:

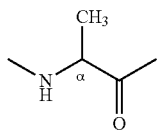

and a L biradical corresponding to —(CH$_2$)$_3$—CH=CH—(CH$_2$)$_3$— or to —(CH$_2$)$_6$—CH=CH—(CH$_2$)$_3$— links both Xs radicals in each sequence.

Cell Lines:
SK-MEL-28, skin, human malignant melanoma, ATCC-HTB-72™
IGR-37, skin, human melanoma derived from metastatic site: groin lymph node.
IGR-39, skin, human melanoma derived from metastatic site: groin lymph node.
B16-F10, skin, mouse melanoma, ATCC-CRL-6475™.
501-MEL, skin, human malignant melanoma.

Cell Culture
Cell lines SK-MEL-28, IGR-37, IGR-39, B16-F10, 501-MEL and A-375 were cultured in incubator at 37° C. in Dulbecco's modified Eagle's medium (Invitrogen Life Technologies, Foster City, CA) containing 10% fetal bovine serum inactivated (FBS, Dutscher, France), penicillin (50 U/ml), and streptomycin sulphate (50 mg/ml) (Gibco BRL, Germany). During the amplification step and the assays adherent cells were rinsed with DPBS (Dulbecco's Phosphate Buffered Saline, Sigma D1283) three times and afterward treated for 5 minutes with trypsin ([0.5 g/ml]/EDTA [0.2 g/ml]) (Gibco-BRL, 15400054) in solution of DPBS at 37° C., and, once detached, transferred in the culturing medium. Cells were counted in a Neubauer chamber after labelling with Tripan-Blue. Each assay was performed only when the viability was superior to 90%.

Viability Assay
Cell lines SK-MEL-28, IGR-37, B16-F10, 501-MEL and A-375 were seeded at a density of 1,000 cells/well in 96 well plates. After 24 h, the compounds to be tested were added to calculate the efficacy at the concentration of 10 μM with serial dilutions. Controls are the untreated cells. Each experiment was performed in triplicate.

Cells were incubated during 72 h in incubator under CO$_2$ atmosphere at 37° C. Cell viability was measured by colorimetric MTT (3-(4,5-dimethylthiazol-2-yl)-2,5-diphenyl tetrazolium bromide) assay. MTT was incubated for a further 4 h, and the medium was then discarded. DMSO was added to dissolve the formazan product, and absorbance at 570 nm was measured with a microplate reader (MULTI-SKAN, Labsystems). Cell viability percentages were calculated by dividing the absorbance value of cells treated with a given compound by the absorbance of untreated cells.

Statistics
Data analysis was performed calculating the percentage of cell viability normalized vs. the values of negative control, which was considered equal to 100%. The dose/response curve was fitted through the sigmoidal equation dose-response (variable slope) and the EC$_{50}$ values were calculated as follow:

$$Y=\text{Bottom}+(\text{Top}-\text{Bottom})/(1+10^{[(\text{Log}\,EC50-X)*\text{HillSlope}]}),$$

where: X is compound concentration (log scale) and Y is the response

Calculations and graphs were conducted using GraphPad Prism (Prism 6 for Windows).

2. Results
2.1 Efficacy Results
Tables 2a, 2b and 2c provide the anti-proliferative activity in several melanoma cell lines at 10 uM.

TABLE 2a

| Compounds | SK-MEL-28 | 501-MEL |
|---|---|---|
| F05 | 60 | 90 |
| F13 | 40 | 40 |
| F16 | 50 | 50 |
| F18 | 70 | 70 |
| F22 | 100 | 90 |
| F29 | 30 | 30 |
| F31 | 60 | 70 |

TABLE 2b

| Compounds | IGR-37 |
|---|---|
| F13 | 40 |
| F16 | 50 |
| F18 | 60 |
| F22 | 80 |
| F31 | 30 |

TABLE 2c

| Compounds | B16-F10 |
|---|---|
| F05 | 60 |
| F18 | 40 |

TABLE 2c-continued

| Compounds | B16-F10 |
|---|---|
| F22 | 40 |
| F31 | 50 |

All the peptides of the invention show a remarkable anticancer activity against the tested melanoma cell lines, even of aggressive phenotypes.

2.2 Measurement of Melanin Content in B16-F10 Melanoma Cells

B16-F10 melanoma cells were seeded into 25 $cm^2$ cell culture flask and incubated for 24 h. Then, 0.1 µM α-MSH was added and cells were treated with the aforementioned peptides at doses lower than their respective IC50 for a total of 48 h incubation. After washing twice with phosphate buffered saline, cells were dissolved in 1 mL of 1N NaOH. For measurement of melanin content, 100 µL aliquots of solution were then placed in 96-well plates and the absorbance was measured at 450 nm using microplate reader. Anti-melanin activity was expressed by the percentage of melanin to that of untreated melanoma cells. As positive control Kojic Acid (KA) was used at different concentrations (0.1, 1 and 10 µM).

The results are summarized in FIG. 1. As it can be seen, the peptides of the invention are involved in melanogenesis pathway. Thus, some of the peptides stimulate the production of melanin, which can be an indicia of melanocyte activation, whereas others, such as F22 and F29 drastically reduces the amount of melanin. What is even more remarkably is the fact that the peptides of the invention are more efficient in regulating melanocytes when compared with other compounds. In this regard, it was found that KA was used at a concentration of 1 uM the reduction was substantially lower than the reduction achieved when the peptide of the invention F22 was used at the same concentration.

Therefore, this data not only supports the effect of the peptides of the invention on melanocyte activity, but also illustrates that they are even more efficient than other compounds available in the state of the art currently used with the same aim.

2.3 Determinations of Depigmenting Activity in Zebrafish Embryos.

Pigment formation during zebrafish development starts at about 24 hpf by the retinal pigment epithelium (RPE) and then progresses towards the dorsolateral skin, where melanocytes are distributed. Biochemical melanin quantification performed in untreated embryos to compare to embryos treated with compound F22. F22 was dissolved in 1×PBS to stock solution. To proceed to zebrafish embryos drug incubation, F22 was serially diluted in E3 medium to obtain: 2.5 UM in a final volume of 1 ml.

Melanin Quantification Assay 50 embryos per triplicate were collected and dissolved in lysis buffer at 95° C. for 30 minutes. 200 UL of the solution was placed in a 96 well plate and total melanin content was quantified using spectrometer at 490 nm. Results were compared with synthetic melanin. Standard curve by plotting the average Blank-corrected 490 nm measurement for each Melanin standard vs its concentration in µg/mL. Standard curve was used to determine the melanin protein concentration of each unknown sample.

Imaging Analysis:

Embryos were placed in a robotic microfluidic system VAST (Union Biometrica), which allows the automatic aspiration, placement and rotation of the larvae under the microscope (Leica, DM6-B). Once embryos were positioned under the right angle (dorsal view), images are acquired with the VAST onboard camera. One dorsal image was acquired per larva. FIJI program was used for the quantification. RGB Images were converted to 8-bit and the orientation of the larvae was determined. A fixed threshold was applied for generating binary masks from the images. A specific region of interest ROI was selected depending on the orientation of the larva. The ROIs were generated such that the eyes would be excluded from the quantification. Segmented areas inside the ROIs were then measured using the Analyse Pixels command. The Level of pigmentation was provided as the sum of all pixels in those areas.

Results: Melanin Quantification

TABLE 1

Melanin quantification by biochemical analysis. The table shows the quantification of melanin as percentage compared to the negative control (E3 medium) at 72 hrs of incubation.

| | Melanine concentration (% to control) |
|---|---|
| Untreated | 100 |
| F22 2.5 uM | 61.41** |

Asterisks indicate statistical significance after a One-way ANOVA: * $p < 0.05$;  $p < 0.01$; * $p < 0.001$.

TABLE 2

Melanin quantification by imaging analysis. Melanin content is calculated as the mean of the sum of pixels related to the body of each zebrafish larvae (E3 medium) at 96 hpf.

| | Pigmented area (pixels) |
|---|---|
| Untreated | 11200.00 |
| F22 2.5 uM | 6500.00*** |

Asterisks indicate statistical significance after a One-way ANOVA: * $p < 0.05$;  $p < 0.01$; * $p < 0.001$.

From both quantifications used, it can be concluded that there are evidences of depigmenting effect of compound F22 at 2.5 µM when analyzing the biochemical melanin amount and, comparing with the analysis of the imaging study.

CITATION LIST

Altschul et al., "Basic local alignment search tool", 1990, J. Mol. Biol, v. 215, pages 403-410;

Copolovici D. M. et al., "Cell-Penetrating Peptides: Design, Synthesis, and Applications", 2014, ACS Nano, 2014, 8 (3), pp 1972-1994;

Higgins et al., "CLUSTAL V: improved software for multiple sequence alignment", 1992, CABIOS, 8 (2), pages 189-191;

Kim Young-Woo et al., "Synthesis of all-hydrocarbon stapled a-helical peptides by ring-closing olefin metathesis", Nature Protocols, 2011, 6 (6), p. 761-771;

Kolb H. C. et al., "The growing impact of click chemistry on drug discovery", 2003, Drug Discov Today, 8 (24): 1128-1137); and Scott J. M. et al., "Application of Ring-Closing Metathesis to the Synthesis of Rigidified Amino Acids and Peptides", 1996, J. Am. Chem. Soc., 1996, 118 (40), pp 9606-9614;

For reasons of completeness, various aspects of the invention are set out in the following numbered clauses:

Clauses

1. A peptide or a pharmaceutical or cosmetical acceptable salt thereof, the peptide having an amino acid sequence with at least 85% identity with respect sequence SEQ ID NO: 1 or 2:

(SEQ ID NO: 1)
(Trp)$_m$-(Asn)$_n$-Lys-Gly-Thr-Ile-Leu-Lys-Ala-Ser-Val-Asp-Tyr-Ile-Arg-Lys-(Leu)$_p$-(Gln)$_q$ (SEQ ID NO: 2)
(Arg)$_{mx}$-(Arg)$_{nx}$-Arg-Arg-Phe-Asn-Ile-Asn-Asp-Arg-Ile-Lys-Glu-Leu-Gly-Thr-Leu-(Ile)$_{px}$-(Pro)$_{qx}$ wherein
"m", "n", "p", and "q" represent integers and are selected from 0 and 1;
"$m_x$", "$n_x$", "$p_x$", and "$q_x$" represent integers and are selected from 0 and 1;
a C-terminal end corresponding to —C(O) $R_4$;
a N-terminal end corresponding to —NHR$_5$;
$R_4$ is a radical selected from the group consisting of —OH and —NR$_{17}$R$_{18}$;
$R_5$ is a radical selected from the group consisting of —H, (C$_1$-C$_{20}$)alkyl and (C$_1$-C$_{10}$)alkyl substituted by one or more radicals selected from the group consisting of: halogen, (C$_1$-C$_{10}$)alkyl, —OR$_6$, —NR$_7$R$_8$, —SR$_9$, —SOR$_{10}$, —SO$_2$R$_{11}$, and —CO$_2$R$_{12}$; and
$R_{17}$ and $R_{18}$ are radicals independently selected from the group consisting of: —H, (C$_1$-C$_{10}$)alkyl and (C$_1$-C$_{10}$)alkyl substituted by one or more radicals selected from the group consisting of: halogen, (C$_1$-C$_{10}$)alkyl, —OR$_6$, —NR$_7$R$_8$, —SR$_9$, —SOR$_{10}$, —SO$_2$R$_{11}$, and —CO$_2$R$_{12}$; the peptide optionally including a linker biradical "L" of formula (I)

—[(R$_1$)$_a$—(R$_2$)—(R$_3$)$_b$]$_c$—    (I)

which is connecting an alpha carbon atom of an amino acid located at position "I" with an alpha carbon atom of an amino acid located at position "i+4" or "i+7" in the peptide sequence
wherein
"a" and "b" are the same or different and are 0 or 1;
"c" is comprised from 1 to 10;
$R_1$ and $R_3$ are biradicals independently selected from the group consisting of: (C$_1$-C$_{10}$)alkyl; (C$_1$-C$_{10}$)alkyl substituted by one or more radicals selected from the group consisting of: halogen, (C$_1$-C$_{10}$)alkyl, —OR$_6$, —NR$_7$R$_8$, —SR$_9$, —SOR$_{10}$, —SO$_2$R$_{11}$, and —CO$_2$R$_{12}$; (C$_2$-C$_{10}$)alkenyl; (C$_2$-C$_{10}$)alkenyl substituted by one or more radicals selected from the group consisting of: halogen, (C$_1$-C$_{10}$)alkyl, —OR$_6$, —NR$_7$R$_8$, —SR$_9$, —SOR$_{10}$, —SO$_2$R$_{11}$, and —CO$_2$R$_{12}$; (C$_2$-C$_{10}$)alkynyl; and (C$_2$-C$_{10}$)alkynyl substituted by one or more radicals selected from the group consisting of: halogen, (C$_1$-C$_{10}$)alkyl, —OR$_6$, —NR$_7$R$_8$, —SR$_9$, —SOR$_{10}$, —SO$_2$R$_{11}$, and —CO$_2$R$_{12}$;
$R_2$ is a biradical selected from the group consisting of: —O—, C(=O), C(=O)NR$_{13}$, C(=O)O, S(=O), S(=O)$_2$, NR$_{14}$, (C$_1$-C$_{10}$)alkyl, (C$_2$-C$_{10}$)alkenyl, (C$_2$-C$_{10}$)alkynyl, —NR$_{15}$—NR$_{16}$—, —N=N—, —S—S—, and a known ring system comprising from 3 to 14 members, the system comprising from 1 to 3 rings, where:
each one of the rings is saturated, partially unsaturated, or aromatic;
the rings are isolated, partially or totally fused,
each one of the members forming the known ring system is selected from the group consisting of: —CH—, —CH$_2$—, —NH—, —N—, —SH—, —S—, and —O—; and
the ring system is optionally substituted by one or more radicals independently selected from the group consisting of halogen, —OH, —NO$_2$, (C$_1$-C$_{10}$)alkyl, (C$_1$-C$_{10}$)haloalkyl, and (C$_1$-C$_{10}$)alkyl-O—; and
$R_6$, $R_7$, $R_8$, $R_9$, $R_{10}$, $R_{11}$, $R_{12}$, $R_{13}$, $R_{14}$, $R_{15}$, and $R_{16}$ are radicals independently selected from the group consisting of: —H and (C$_1$-C$_{10}$)alkyl; and
the amino acids which are connected by the linker being of formula (II)

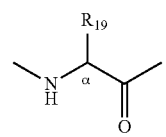

(II)

wherein
$R_{19}$ is a monoradical selected from the group consisting of: (C$_1$-C$_{10}$)alkyl, (C$_2$-C$_{10}$)alkenyl, (C$_2$-C$_{10}$)alkynyl, and a known ring system comprising from 3 to 14 members, the system comprising from 1 to 3 rings, where:
each one of the rings is saturated, partially unsaturated, or aromatic;
the rings are isolated, partially or totally fused,
each one of the members forming the known ring system is selected from the group consisting of: —CH—, —CH$_2$—, —NH—, —N—, —SH—, —S—, and —O—.

2. The peptide according to clause 1, which has an identity of 100% with respect to sequence SEQ ID NO: 1 or 2.

3. The peptide according to any of the previous clauses, wherein the linker biradical of formula (I) is between an alpha carbon atom of an amino acid located at position "i" in the peptide sequence of sequence SEQ ID NO: 1 and an alpha carbon atom of an amino acid located at position "i+7" in the peptide sequence SEQ ID NO: 1; or, alternatively, is between an alpha carbon atom of an amino acid located at position "1" in the peptide sequence of sequence SEQ ID NO: 2 and an alpha carbon atom of an amino acid located at position "i+7" in the peptide sequence SEQ ID NO: 2.

4. The peptide according to any one of the previous clauses, wherein a=b=c=1.

5. The peptide according to any one of the previous clauses, wherein $R_1$ and $R_3$ are biradicals independently selected from the group consisting of: (C$_1$-C$_{10}$)alkyl; (C$_2$-C$_{10}$)alkenyl; and (C$_2$-C$_{10}$)alkynyl;
$R_2$ is a biradical selected from the group consisting of: (C$_1$-C$_{10}$)alkyl, (C$_2$-C$_{10}$)alkenyl, and (C$_2$-C$_{10}$)alkynyl; and
$R_{19}$ is a monoradical selected from the group consisting of: (C$_1$-C$_{10}$)alkyl, (C$_2$-C$_{10}$)alkenyl, and (C$_2$-C$_{10}$)alkynyl;

6. The peptide according to any one of the previous clauses, wherein $R_1$, $R_3$ and $R_{19}$ are (C$_1$-C$_{10}$)alkyl; and $R_2$ is (C$_2$-C$_{10}$)alkenyl.

7. The peptide according to any one of the previous clauses, wherein the C-terminal end corresponds to —C(O)OH or —C(O)NH$_2$, and the N-terminal end corresponds to —NH$_2$.
8. The peptide according to any one of the previous clauses, which has at least a 85%, at least 90%, at least 95% or it is 100% identical to a peptide sequence SEQ ID NO: 3 to 16, wherein "L", "R$_{19}$", "m", "n", "p", "q", "m$_x$", "n$_x$", "p$_x$" and "q$_x$" are as defined in any of the preceding clauses.
9. The peptide according to any one of the previous clauses, which is a peptide with an amino acid having at least 85%, at least 90%, at least 95% or is 100% identical to an amino acid sequence selected from the group consisting of: SEQ ID NO: 17 to 23.
10. A pharmaceutical or cosmetical composition comprising a therapeutically or cosmetically effective amount of the peptide as defined in any one of the clauses 1-9, together with acceptable pharmaceutical or cosmetical excipients and/or carriers.
11. A non-therapeutic use of a peptide or cosmetical salt thereof as defined in any one of the clauses 1-9 or a cosmetical composition as defined in clause 10 for regulating melanogenesis, particularly for reducing or increasing the production of melanin.
12. The non-therapeutic use of a peptide according to clause 11 for the treatment of hyperpigmentation or hypopigmentation.
13. A peptide or pharmaceutical salt thereof as defined in any one of the clauses 1-9 or a pharmaceutical composition as defined in clause 10 for use as a medicament.
14. A peptide or a pharmaceutical salt thereof as defined in any one of the clauses 1-9 or the pharmaceutical composition as defined in clause 10, for use in the treatment and/or prevention of cancer, particularly a melanoma cancer, such as a metastatic melanoma cancer.
15. A peptide or pharmaceutical salt thereof as defined in any one of the clauses 1-9 or the pharmaceutical composition as defined in clause 10, for use in the treatment and/or prevention of a disease related to the dysregulation of melanogenesis, particularly by inhibiting cancer melanocytes proliferation.

The invention claimed is:

1. A peptide or a pharmaceutical or cosmetical acceptable salt thereof, the peptide comprising at least 85% identity to SEQ ID NO: 1 or 2:

(SEQ ID NO: 1)
$(Trp)_m$-$(Asn)_n$-Lys-Gly-Thr-Ile-Leu-Lys-Ala-Ser-Val-Asp-Tyr-Ile-Arg-Lys-$(Leu)_p$-$(Gln)_q$ (SEQ ID NO: 2)
$(Arg)_{mx}$-$(Arg)_{nx}$-Arg-Arg-Phe-Asn-Ile-Asn-Asp-Arg-Ile-Lys-Glu-Leu-Gly-Thr-Leu-$(Ile)_{px}$-$(Pro)_{qx}$ wherein:
"m", "n", "p", and "q" are independently selected from 0 and 1;
"$m_x$", "$n_x$", "$p_x$", and "$q_x$" are independently selected from 0 and 1;
a C-terminal end corresponding to $-C(O)R_4$;
a N-terminal end corresponding to $-NHR_5$;
$R_4$ is a radical selected from the group consisting of $-OH$ and $-NR_{17}R_{18}$;
$R_5$ is a radical selected from the group consisting of:
  $-H$, $(C_1-C_{20})$alkyl, and $(C_1-C_{10})$alkyl substituted by one or more radicals selected from the group consisting of:
    halogen, $(C_1-C_{10})$alkyl, $-OR_6$, $-NR_7R_8$, $-SR_9$, $-SOR_{10}$, $-SO_2R_{11}$, and $-CO_2R_{12}$; and
$R_{17}$ and $R_{18}$ are radicals independently selected from the group consisting of:
  $-H$, $(C_1-C_{10})$alkyl, and $(C_1-C_{10})$alkyl substituted by one or more radicals selected from the group consisting of:
    halogen, $(C_1-C_{10})$alkyl, $-OR_6$, $-NR_7R_8$, $-SR_9$, $-SOR_{10}$, $-SO_2R_{11}$, and $-CO_2R_{12}$;
wherein the peptide further includes a linker biradical "L" of formula (I)

$$-[(R_1)_a-(R_2)-(R_3)_b]_c- \quad (I)$$

wherein the linker biradical "L" connects an alpha carbon atom of an amino acid located at position "i" with an alpha carbon atom of an amino acid located at position "i+4" or "i+7" in the peptide sequence,
wherein:
"a" and "b" are the same or different and are 0 or 1;
"c" is from 1 to 10;
$R_1$ and $R_3$ are biradicals independently selected from the group consisting of:
  $(C_1-C_{10})$alkyl;
  $(C_1-C_{10})$alkyl substituted by one or more radicals selected from the group consisting of:
    halogen, $(C_1-C_{10})$alkyl, $-OR_6$, $-NR_7R_8$, $-SR_9$, $-SOR_{10}$, $-SO_2R_{11}$, and $-CO_2R_{12}$;
  $(C_2-C_{10})$alkenyl;
  $(C_2-C_{10})$alkenyl substituted by one or more radicals selected from the group consisting of:
    halogen, $(C_1-C_{10})$alkyl, $-OR_6$, $-NR_7R_8$, $-SR_9$, $-SOR_{10}$, $-SO_2R_{11}$, and $-CO_2R_{12}$;
  $(C_2-C_{10})$alkynyl; and
  $(C_2-C_{10})$alkynyl substituted by one or more radicals selected from the group consisting of:
    halogen, $(C_1-C_{10})$alkyl, $-OR_6$, $-NR_7R_8$, $-SR_9$, $-SOR_{10}$, $-SO_2R_{11}$, and $-CO_2R_{12}$;
$R_2$ is a biradical selected from the group consisting of:
  $-O-$, $C(=O)$, $C(=O)NR_{13}$, $C(=O)O$, $S(=O)$, $S(=O)_2$, $NR_{14}$, $(C_1-C_{10})$alkyl, $(C_2-C_{10})$alkenyl, $(C_2-C_{10})$alkynyl, $-NR_{15}-NR_{16}-$, $-N=N-$, $-S-S-$, and a ring system comprising from 3 to 14 members, the system comprising from 1 to 3 rings,
wherein:
each one of the rings is saturated, partially unsaturated, or aromatic;
the rings are isolated, partially or totally fused;
each one of the members forming the ring system is selected from the group consisting of:
  $-CH-$, $-CH_2-$, $-NH-$, $-N-$, $-SH-$, $-S-$, and $-O-$; and
the ring system is optionally substituted by one or more radicals independently selected from the group consisting of:
  halogen, $-OH$, $-NO_2$, $(C_1-C_{10})$alkyl, $(C_1-C_{10})$haloalkyl, and $(C_1-C_{10})$alkyl-$O-$; and
$R_6$, $R_7$, $R_8$, $R_9$, $R_{10}$, $R_{11}$, $R_{12}$, $R_{13}$, $R_{14}$, $R_{15}$, and $R_{16}$ are radicals independently selected from the group consisting of: $-H$ and $(C_1-C_{10})$alkyl; and
wherein a compound of formula (II) is connected to the peptide by the linker biradical "L"

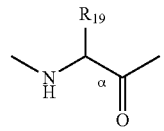

(II)

wherein:
$R_{19}$ is a monoradical selected from the group consisting of: $(C_1-C_{10})$alkyl, $(C_2-C_{10})$alkenyl, $(C_2-C_{10})$alkynyl, and a ring system comprising from 3 to 14 members, the system comprising from 1 to 3 rings,
wherein:
each one of the rings is saturated, partially unsaturated, or aromatic;
the rings are isolated, partially or totally fused; and
each one of the members forming the ring system is selected from the group consisting of:
  $-CH-$, $-CH_2-$, $-NH-$, $-N-$, $-SH-$, $-S-$, and $-O-$.

2. The peptide according to claim 1, having a sequence identity of 100% with respect to sequence SEQ ID NO: 1 or 2.

3. The peptide according to claim 1,
wherein:
the linker biradical "L" of formula (I) is between an alpha carbon atom of an amino acid located at position "i" in the peptide sequence of sequence SEQ ID NO: 1 and an alpha carbon atom of an amino acid located at position "i+7" in the peptide sequence SEQ ID NO: 1; or,
alternatively, the linker biradical "L" of formula (I) is between an alpha carbon atom of an amino acid located at position "i" in the peptide sequence of sequence SEQ ID NO: 2 and an alpha carbon atom of an amino acid located at position "i+7" in the peptide sequence SEQ ID NO: 2.

4. The peptide according to claim 1, wherein a=b=c=1.

5. The peptide according to claim 1,
wherein:
$R_1$ and $R_3$ are biradicals independently selected from the group consisting of: $(C_1-C_{10})$alkyl; $(C_2-C_{10})$alkenyl; and $(C_2-C_{10})$alkynyl;

R$_2$ is a biradical selected from the group consisting of: (C$_1$-C$_{10}$)alkyl, (C$_2$-C$_{10}$)alkenyl, and (C$_2$-C$_{10}$)alkynyl; and R$_{19}$ is a monoradical selected from the group consisting of: (C$_1$-C$_{10}$)alkyl, (C$_2$-C$_{10}$)alkenyl, and (C$_2$-C$_{10}$)alkynyl.

6. The peptide according to claim 1, wherein the C-terminal end corresponds to —C(O)OH or —C(O)NH$_2$, and the N-terminal end corresponds to —NH$_2$.

7. The peptide according to claim 1, wherein:
the peptide has an amino acid sequence that is at least 85%, at least 90%, at least 95%, or is 100% identical to one of SEQ ID NO: 3 to 16, wherein "L", "R$_{19}$", "m", "n", "p", "q", "m$_x$", "n$_x$", "p$_x$" and "q$_x$" are as defined in any of the preceding claims; or,
alternatively, the peptide has an amino acid sequence that is at least 85%, at least 90%, at least 95%, or is 100% identical to one of SEQ ID NO: 17 to 23.

8. The peptide according to claim 1, which is conjugated to a label, drug, a cell penetrating peptide, or a PROTAC.

9. A pharmaceutical or cosmetical composition comprising a therapeutically or cosmetically effective amount of a peptide or a pharmaceutical or cosmetical acceptable salt thereof as defined in claim 1, together with acceptable pharmaceutical or cosmetical excipients and/or carriers.

10. The pharmaceutical or cosmetical composition according to claim 9, which is a topical composition.

11. A method for regulating melanogenesis in a subject in need thereof, the method comprising administering to the subject a therapeutically effective amount of a peptide or pharmaceutical salt thereof as defined in claim 1.

12. The method according to claim 11, wherein the peptide or salt thereof is other than a peptide consisting of sequence SEQ ID NO: 24, 25, and 26.

13. The method according to claim 11 which is for treatment of hyperpigmentation or hypopigmentation.

14. A method for treating cancer in a subject in need thereof, the method comprising administering to the subject a therapeutically effective amount of a peptide or pharmaceutical salt thereof as defined in claim 1.

15. The method according to claim 14, wherein the peptide or salt thereof is other than a peptide consisting of sequence SEQ ID NO: 24, 25, and 26.

16. A method for treating a disease related to the dysregulation of melanogenesis in a subject in need thereof, the method comprising administering to the subject a therapeutically effective amount of a peptide or pharmaceutical salt thereof as defined in claim 1.

17. The method as claimed in claim 16, wherein the peptide or salt is other than a peptide consisting of sequence SEQ ID NO: 24, 25, and 26.

18. A composition selected from the group consisting of:
I) a depigmenting composition comprising a peptide as defined in claim 1 and
one or more cosmetically acceptable excipients; and
II) a pigmenting composition comprising a peptide as defined in claim
wherein the depigmenting composition and/or the pigmenting composition optionally further comprise one or more cosmetically acceptable excipients.

19. The composition of claim 18, wherein the depigmenting composition is a topical depigmenting composition.

20. The composition of claim 18, wherein the pigmenting composition is a topical pigmenting composition.

* * * * *

SEQUENCE LISTING

```
<160> NUMBER OF SEQ ID NOS: 26

<210> SEQ ID NO 1
<211> LENGTH: 18
<212> TYPE: PRT
<213> ORGANISM: Artificial Sequence
<220> FEATURE:
<223> OTHER INFORMATION: Peptide
<220> FEATURE:
<221> NAME/KEY: MISC_FEATURE
<223> OTHER INFORMATION: the peptide comprises a linker birradical of
      formula (I) -[(R1)a-(R2)-(R3)b]c- connecting an amino acid at
      position "i" with an amino acid at position "i+3" or "i+7"
<220> FEATURE:
<221> NAME/KEY: MISC_FEATURE
<223> OTHER INFORMATION: R1 and R3 are birradicals independently
      selected from the group consisting of: (C1-C10)alkyl;
      (C1-C10)alkyl substituted; (C2-C10)alkenyl; (C2-C10)alkenyl
      substituted; (C2-C10)alkynyl; and (C2-C10)alkynyl substituted;
<220> FEATURE:
<221> NAME/KEY: MISC_FEATURE
<223> OTHER INFORMATION: "(C1-C10)alkyl substituted" means (C1-C10)alkyl
      substituted by one or more radicals selected from: halogen,
      (C1-C10)alkyl, OR6, NR7R8, SR9, SOR10, SO2R11 and CO2R12
<220> FEATURE:
<221> NAME/KEY: MISC_FEATURE
<223> OTHER INFORMATION: "(C2-C10)alkenyl substituted" means
      (C2-C10)alkenyl substituted by one or more radicals selected from:
      halogen, (C1-C10)alkyl, OR6 ,NR7R8, SR9, SOR10, SO2R11 and CO2R12
<220> FEATURE:
<221> NAME/KEY: MISC_FEATURE
<223> OTHER INFORMATION: "(C2-C10)alkynyl substituted" means
      (C2-C10)alkynyl substituted by one or more radicals selected from:
      halogen, (C1-C10)alkyl, OR6 ,NR7R8, SR9, SOR10, SO2R11 and CO2R12
<220> FEATURE:
<221> NAME/KEY: MISC_FEATURE
<223> OTHER INFORMATION: R2 is a birradical selected from: -O-, C(=O),
      C(=O)NR13, C(=O)O, S(=O), S(=O)2, NR14, (C1-C10)alkyl,
      (C2-C10)alkenyl, (C2-C10)alkynyl, -NR15-NR16-, -N=N-, -S-S-, and a
      known ring system comprising from 3 to 14 members optionally
      substituted
<220> FEATURE:
<221> NAME/KEY: MISC_FEATURE
<223> OTHER INFORMATION: "a" and "b" are the same or different and are 0
      or 1; and "c" is comprised from 1 to 10
<220> FEATURE:
<221> NAME/KEY: MISC_FEATURE
<223> OTHER INFORMATION: the amino acids which are connected by the
      linker of formula (I), being of formula (II) -NH-C(R19)-C(=O)-,
      wherein R19 is a monoradical selected from (C1-C10)alkyl,
```

```
           (C2-C10)alkenyl, (C2-C10)alkynyl and a known ring system
           comprising from 3 to 14
<220> FEATURE:
<221> NAME/KEY: MISC_FEATURE
<223> OTHER INFORMATION: the C-terminal end corresponds to -C(O)R4,
      wherein R4 is selected from -OH and-NR17R18
<220> FEATURE:
<221> NAME/KEY: MISC_FEATURE
<223> OTHER INFORMATION: the N-terminal end corresponds to -NHR5,
      wherein R5 is selected from -H, (C1-C20)alkyl and C1-C10)alkyl
      substituted by one or more radicals selected from the group
      consisting of: halogen, (C1-C10)alkyl, -OR6, -NR7R8, -SR9, -SOR10,
      -SO2R11, and -CO2R1
<220> FEATURE:
<221> NAME/KEY: MISC_FEATURE
<223> OTHER INFORMATION: known ring system "optionally substituted"
      means that the system is optionally substituted by one or more
      radicals independently selected from halogen,OH,NO2,(C1-C10)alkyl,
      (C1-C10)haloalkyl and (C1-C10)alkyl-O-
<220> FEATURE:
<221> NAME/KEY: MISC_FEATURE
<223> OTHER INFORMATION: R6 to R16 are radicals independently selected
      from H and (C1-C10)alkyl
<220> FEATURE:
<221> NAME/KEY: MISC_FEATURE
<223> OTHER INFORMATION: R17 to R18 are radicals independently selected
      from H, (C1-C10)alkyl, and (C1-C10)alkyl substituted by one or
      more radicals selected from the group consisting of: halogen,
      (C1-C10)alkyl, -OR6, -NR7R8, -SR9, -SOR10, -SO2R11, and -CO2R12
<220> FEATURE:
<221> NAME/KEY: MISC_FEATURE
<222> LOCATION: (1)..(1)
<223> OTHER INFORMATION: X means (Trp)m, wherein m is 0 or 1
<220> FEATURE:
<221> NAME/KEY: MISC_FEATURE
<222> LOCATION: (2)..(2)
<223> OTHER INFORMATION: X means (Asn)n, wherein n is 0 or 1
<220> FEATURE:
<221> NAME/KEY: MISC_FEATURE
<222> LOCATION: (17)..(17)
<223> OTHER INFORMATION: X means (Leu)p, wherein p is 0 or 1
<220> FEATURE:
<221> NAME/KEY: MISC_FEATURE
<222> LOCATION: (18)..(18)
<223> OTHER INFORMATION: X means (Gln)q, wherein q is 0 or 1

<400> SEQUENCE: 1

Xaa Xaa Lys Gly Thr Ile Leu Lys Ala Ser Val Asp Tyr Ile Arg Lys
1               5                   10                  15

Xaa Xaa

<210> SEQ ID NO 2
<211> LENGTH: 19
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<223> OTHER INFORMATION: the peptide comprises a linker birradical of
      formula (I) -[(R1)a-(R2)-(R3)b]c- connecting an amino acid at
      position "i" with an amino acid at position "i+3" or "i+7"
<220> FEATURE:
<221> NAME/KEY: MISC_FEATURE
<223> OTHER INFORMATION: R1 and R3 are birradicals independently
      selected from the group consisting of: (C1-C10)alkyl;
      (C1-C10)alkyl substituted; (C2-C10)alkenyl; (C2-C10)alkenyl
      substituted; (C2-C10)alkynyl; and (C2-C10)alkynyl substituted;
<220> FEATURE:
<221> NAME/KEY: MISC_FEATURE
<223> OTHER INFORMATION: "(C1-C10)alkyl substituted" means (C1-C10)alkyl
      substituted by one or more radicals selected from: halogen,
      (C1-C10)alkyl, OR6,NR7R8, SR9, SOR10, SO2R11 and CO2R12
<220> FEATURE:
<221> NAME/KEY: MISC_FEATURE
<223> OTHER INFORMATION: "(C2-C10)alkenyl substituted" means
```

```
      (C2-C10)alkenyl substituted by one or more radicals selected from:
      halogen, (C1-C10)alkyl, OR6 ,NR7R8, SR9, SOR10, SO2R11 and CO2R12
<220> FEATURE:
<221> NAME/KEY: MISC_FEATURE
<223> OTHER INFORMATION: "(C2-C10)alkynyl substituted" means
      (C2-C10)alkynyl substituted by one or more radicals selected from:
      halogen, (C1-C10)alkyl, OR6 ,NR7R8, SR9, SOR10, SO2R11 and CO2R12
<220> FEATURE:
<221> NAME/KEY: MISC_FEATURE
<223> OTHER INFORMATION: R2 is a birradical selected from: -O-, C(=O),
      C(=O)NR13, C(=O)O, S(=O), S(=O)2, NR14, (C1-C10)alkyl,
      (C2-C10)alkenyl, (C2-C10)alkynyl, -NR15-NR16-, -N=N-, -S-S-, and a
      known ring system comprising from 3 to 14 members optionally
      substituted
<220> FEATURE:
<221> NAME/KEY: MISC_FEATURE
<223> OTHER INFORMATION: "a" and "b" are the same or different and are 0
      or 1; and "c" is comprised from 1 to 10
<220> FEATURE:
<221> NAME/KEY: MISC_FEATURE
<223> OTHER INFORMATION: the amino acids which are connected by the
      linker of formula (I), being of formula (II) -NH-C(R19)-C(=O)-,
      wherein R19 is a monoradical selected from (C1-C10)alkyl,
      (C2-C10)alkenyl, (C2-C10)alkynyl and a known ring system
      comprising from 3 to 14
<220> FEATURE:
<221> NAME/KEY: MISC_FEATURE
<223> OTHER INFORMATION: the C-terminal end corresponds to -C(O)R4,
      wherein R4 is selected from -OH and-NR17R18
<220> FEATURE:
<221> NAME/KEY: MISC_FEATURE
<223> OTHER INFORMATION: the N-terminal end corresponds to -NHR5,
      wherein R5 is selected from -H, (C1-C20)alkyl, and (C1-C10)alkyl
      substituted by one or more radicals selected from the group
      consisting of: halogen, (C1-C10)alkyl, -OR6, -NR7R8, -SR9, -SOR10,
      -SO2R11, and -CO2R12
<220> FEATURE:
<221> NAME/KEY: MISC_FEATURE
<223> OTHER INFORMATION: the "known ring system" comprises from 1 to 3
      rings, each one of the rings being (a) saturated, partially
      saturated or aromatic, and (b) isolated, partially or totally
      fused; and each member being selected from CH,CH2,NH,N,SH,S,and O
<220> FEATURE:
<221> NAME/KEY: MISC_FEATURE
<223> OTHER INFORMATION: known ring system "optionally substituted"
      means that the system is optionally substituted by one or more
      radicals independently selected from halogen,OH,NO2,(C1-C10)alkyl,
      (C1-C10)haloalkyl and (C1-C10)alkyl-O-
<220> FEATURE:
<221> NAME/KEY: MISC_FEATURE
<223> OTHER INFORMATION: R6 to R16 are radicals independently selected
      from H and (C1-C10)alkyl
<220> FEATURE:
<221> NAME/KEY: MISC_FEATURE
<223> OTHER INFORMATION: R17 to R18 are radicals independently selected
      from H, (C1-C10)alkyl, and (C1-C10)alkyl substituted by one or
      more radicals selected from the group consisting of: halogen,
      (C1-C10)alkyl, -OR6, -NR7R8, -SR9, -SOR10, -SO2R11, and -CO2R12
<220> FEATURE:
<221> NAME/KEY: MISC_FEATURE
<222> LOCATION: (1)..(1)
<223> OTHER INFORMATION: X means (Arg)mx, wherein mx is 0 or 1
<220> FEATURE:
<221> NAME/KEY: MISC_FEATURE
<222> LOCATION: (2)..(2)
<223> OTHER INFORMATION: X means (Arg)nx, wherein nx is 0 or 1
<220> FEATURE:
<221> NAME/KEY: MISC_FEATURE
<222> LOCATION: (18)..(18)
<223> OTHER INFORMATION: X means (Ile)px, wherein px is 0 or 1
<220> FEATURE:
<221> NAME/KEY: MISC_FEATURE
<222> LOCATION: (19)..(19)
<223> OTHER INFORMATION: X means (Pro)qx, wherein qx is 0 or 1

<400> SEQUENCE: 2

Xaa Xaa Arg Arg Phe Asn Ile Asn Asp Arg Ile Lys Glu Leu Gly Thr
1               5                   10                  15
```

Leu Xaa Xaa

<210> SEQ ID NO 3
<211> LENGTH: 18
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (3)..(3)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 10 by a linker
<220> FEATURE:
<221> NAME/KEY: MISC_FEATURE
<222> LOCATION: (10)..(10)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 3 by a linker
<220> FEATURE:
<221> NAME/KEY: MISC_FEATURE
<222> LOCATION: (17)..(17)
<223> OTHER INFORMATION: X means (Leu)p, wherein p is 0 or 1
<220> FEATURE:
<221> NAME/KEY: MISC_FEATURE
<222> LOCATION: (18)..(18)
<223> OTHER INFORMATION: X means (Gln)q, wherein q is 0 or 1

<400> SEQUENCE: 3

Trp Asn Xaa Gly Thr Ile Leu Lys Ala Xaa Val Asp Tyr Ile Arg Lys
1               5                   10                  15

Xaa Xaa

<210> SEQ ID NO 4
<211> LENGTH: 18
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (1)..(1)
<223> OTHER INFORMATION: X means (Trp)m, wherein m is 0 or 1
<220> FEATURE:
<221> NAME/KEY: MISC_FEATURE
<222> LOCATION: (2)..(2)
<223> OTHER INFORMATION: X means (Asn)n, wherein n is 0 or 1
<220> FEATURE:
<221> NAME/KEY: MISC_FEATURE
<222> LOCATION: (7)..(7)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 14 by a linker
<220> FEATURE:
<221> NAME/KEY: MISC_FEATURE
<222> LOCATION: (14)..(14)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 7 by a linker

<400> SEQUENCE: 4

Xaa Xaa Lys Gly Thr Ile Xaa Lys Ala Ser Val Asp Tyr Xaa Arg Lys
1               5                   10                  15

Leu Gln

<210> SEQ ID NO 5

```
<211> LENGTH: 18
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (1)..(1)
<223> OTHER INFORMATION: X means (Trp)m, wherein m is 0 or 1
<220> FEATURE:
<221> NAME/KEY: MISC_FEATURE
<222> LOCATION: (2)..(2)
<223> OTHER INFORMATION: X means (Asn)n, wherein n is 0 or 1
<220> FEATURE:
<221> NAME/KEY: MISC_FEATURE
<222> LOCATION: (10)..(10)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 17 by a linker
<220> FEATURE:
<221> NAME/KEY: MISC_FEATURE
<222> LOCATION: (17)..(17)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 10 by a linker

<400> SEQUENCE: 5

Xaa Xaa Lys Gly Thr Ile Leu Lys Ala Xaa Val Asp Tyr Ile Arg Lys
1               5                   10                  15

Xaa Gln

<210> SEQ ID NO 6
<211> LENGTH: 16
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (3)..(3)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 10 by a linker
<220> FEATURE:
<221> NAME/KEY: MISC_FEATURE
<222> LOCATION: (10)..(10)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 3 by a linker

<400> SEQUENCE: 6

Trp Asn Xaa Gly Thr Ile Leu Lys Ala Xaa Val Asp Tyr Ile Arg Lys
1               5                   10                  15

<210> SEQ ID NO 7
<211> LENGTH: 16
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (5)..(5)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 12 by a linker
<220> FEATURE:
<221> NAME/KEY: MISC_FEATURE
<222> LOCATION: (12)..(12)
```

```
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 5 by a linker

<400> SEQUENCE: 7

Lys Gly Thr Ile Xaa Lys Ala Ser Val Asp Tyr Xaa Arg Lys Leu Gln
1               5                   10                  15

<210> SEQ ID NO 8
<211> LENGTH: 16
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (8)..(8)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 15 by a linker
<220> FEATURE:
<221> NAME/KEY: MISC_FEATURE
<222> LOCATION: (15)..(15)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 8 by a linker

<400> SEQUENCE: 8

Lys Gly Thr Ile Leu Lys Ala Xaa Val Asp Tyr Ile Arg Lys Xaa Gln
1               5                   10                  15

<210> SEQ ID NO 9
<211> LENGTH: 19
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (8)..(8)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 15 by a linker
<220> FEATURE:
<221> NAME/KEY: MISC_FEATURE
<222> LOCATION: (15)..(15)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 8 by a linker
<220> FEATURE:
<221> NAME/KEY: MISC_FEATURE
<222> LOCATION: (18)..(18)
<223> OTHER INFORMATION: X means (Ile)px, wherein px is 0 or 1
<220> FEATURE:
<221> NAME/KEY: MISC_FEATURE
<222> LOCATION: (19)..(19)
<223> OTHER INFORMATION: X means (Pro)qx, wherein qx is 0 or 1

<400> SEQUENCE: 9

Arg Arg Arg Arg Phe Asn Ile Xaa Asp Arg Ile Lys Glu Leu Xaa Thr
1               5                   10                  15

Leu Xaa Xaa

<210> SEQ ID NO 10
<211> LENGTH: 19
<212> TYPE: PRT
<213> ORGANISM: Artificial Sequence
```

```
<220> FEATURE:
<223> OTHER INFORMATION: peptide
<220> FEATURE:
<221> NAME/KEY: MISC_FEATURE
<222> LOCATION: (1)..(1)
<223> OTHER INFORMATION: X means (Arg)mx, wherein mx is 0 or 1
<220> FEATURE:
<221> NAME/KEY: MISC_FEATURE
<222> LOCATION: (2)..(2)
<223> OTHER INFORMATION: X means (Arg)nx, wherein nx is 0 or 1
<220> FEATURE:
<221> NAME/KEY: MISC_FEATURE
<222> LOCATION: (6)..(6)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 13 by a linker
<220> FEATURE:
<221> NAME/KEY: MISC_FEATURE
<222> LOCATION: (13)..(13)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 6 by a linker

<400> SEQUENCE: 10

Xaa Xaa Arg Arg Phe Xaa Ile Asn Asp Arg Ile Lys Xaa Leu Gly Thr
1               5                   10                  15

Leu Ile Pro

<210> SEQ ID NO 11
<211> LENGTH: 19
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (3)..(3)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 10 by a linker
<220> FEATURE:
<221> NAME/KEY: MISC_FEATURE
<222> LOCATION: (10)..(10)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 3 by a linker
<220> FEATURE:
<221> NAME/KEY: MISC_FEATURE
<222> LOCATION: (18)..(18)
<223> OTHER INFORMATION: X means (Ile)px, wherein px is 0 or 1
<220> FEATURE:
<221> NAME/KEY: MISC_FEATURE
<222> LOCATION: (19)..(19)
<223> OTHER INFORMATION: X means (Pro)qx, wherein qx is 0 or 1

<400> SEQUENCE: 11

Arg Arg Xaa Arg Phe Asn Ile Asn Asp Xaa Ile Lys Glu Leu Gly Thr
1               5                   10                  15

Leu Xaa Xaa

<210> SEQ ID NO 12
<211> LENGTH: 19
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (1)..(1)
```

```
<223> OTHER INFORMATION: X means (Arg)mx, wherein mx is 0 or 1
<220> FEATURE:
<221> NAME/KEY: MISC_FEATURE
<222> LOCATION: (2)..(2)
<223> OTHER INFORMATION: X means (Arg)nx, wherein nx is 0 or 1
<220> FEATURE:
<221> NAME/KEY: MISC_FEATURE
<222> LOCATION: (8)..(8)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 15 by a linker
<220> FEATURE:
<221> NAME/KEY: MISC_FEATURE
<222> LOCATION: (15)..(15)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 8 by a linker

<400> SEQUENCE: 12

Xaa Xaa Arg Arg Phe Asn Ile Xaa Asp Arg Ile Lys Glu Leu Xaa Thr
1               5                   10                  15

Leu Ile Pro

<210> SEQ ID NO 13
<211> LENGTH: 17
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (8)..(8)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 15 by a linker
<220> FEATURE:
<221> NAME/KEY: MISC_FEATURE
<222> LOCATION: (15)..(15)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 8 by a linker

<400> SEQUENCE: 13

Arg Arg Arg Arg Phe Asn Ile Xaa Asp Arg Ile Lys Glu Leu Xaa Thr
1               5                   10                  15

Leu

<210> SEQ ID NO 14
<211> LENGTH: 17
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (3)..(3)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 10 by a linker
<220> FEATURE:
<221> NAME/KEY: MISC_FEATURE
<222> LOCATION: (10)..(10)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 3 by a linker

<400> SEQUENCE: 14
```

```
Arg Arg Xaa Arg Phe Asn Ile Asn Asp Xaa Ile Lys Glu Leu Gly Thr
1               5                   10                  15

Leu

<210> SEQ ID NO 15
<211> LENGTH: 17
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (4)..(4)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 11 by a linker
<220> FEATURE:
<221> NAME/KEY: MISC_FEATURE
<222> LOCATION: (11)..(11)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 4 by a linker

<400> SEQUENCE: 15

Arg Arg Phe Xaa Ile Asn Asp Arg Ile Lys Xaa Leu Gly Thr Leu Ile
1               5                   10                  15

Pro

<210> SEQ ID NO 16
<211> LENGTH: 17
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (6)..(6)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 13 by a linker
<220> FEATURE:
<221> NAME/KEY: MISC_FEATURE
<222> LOCATION: (13)..(13)
<223> OTHER INFORMATION: X is an amino acid with side chain
      (C1-C10)alkyl, (C2-C10)alkenyl, (C2-C10)alkynyl or a ring system
      comprising from 3 to 14 members, the alpha carbon of this aa
      connected to the alpha carbon of the aa at position 6 by a linker

<400> SEQUENCE: 16

Arg Arg Phe Asn Ile Xaa Asp Arg Ile Lys Glu Leu Xaa Thr Leu Ile
1               5                   10                  15

Pro

<210> SEQ ID NO 17
<211> LENGTH: 16
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (3)..(3)
<223> OTHER INFORMATION: X is an amino acid with side chain -CH3; the
      alpha carbon of this amino acid being connected to the alpha
      carbon of amino acid at position 10 by the linker
      -(CH2)6-CH=CH-(CH2)3-
<220> FEATURE:
```

```
<221> NAME/KEY: MISC_FEATURE
<222> LOCATION: (10)..(10)
<223> OTHER INFORMATION: X is an amino acid with side chain -CH3; the
      alpha carbon of this amino acid being connected to the alpha
      carbon of amino acid at position 3 by the linker
      -(CH2)6-CH=CH-(CH2)3--

<400> SEQUENCE: 17

Trp Asn Xaa Gly Thr Ile Leu Lys Ala Xaa Val Asp Tyr Ile Arg Lys
1               5                   10                  15

<210> SEQ ID NO 18
<211> LENGTH: 16
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (5)..(5)
<223> OTHER INFORMATION: X is an amino acid with side chain -CH3; the
      alpha carbon of this amino acid being connected to the alpha
      carbon of amino acid at position 12 by the linker
      -(CH2)6-CH=CH-(CH2)3-
<220> FEATURE:
<221> NAME/KEY: MISC_FEATURE
<222> LOCATION: (12)..(12)
<223> OTHER INFORMATION: X is an amino acid with side chain -CH3; the
      alpha carbon of this amino acid being connected to the alpha
      carbon of amino acid at position 5 by the linker
      -(CH2)6-CH=CH-(CH2)3-

<400> SEQUENCE: 18

Lys Gly Thr Ile Xaa Lys Ala Ser Val Asp Tyr Xaa Arg Lys Leu Gln
1               5                   10                  15

<210> SEQ ID NO 19
<211> LENGTH: 16
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (8)..(8)
<223> OTHER INFORMATION: X is an amino acid with side chain -CH3; the
      alpha carbon of this amino acid being connected to the alpha
      carbon of amino acid at position 15 by the linker
      -(CH2)6-CH=CH-(CH2)3-
<220> FEATURE:
<221> NAME/KEY: MISC_FEATURE
<222> LOCATION: (15)..(15)
<223> OTHER INFORMATION: X is an amino acid with side chain -CH3; the
      alpha carbon of this amino acid being connected to the alpha
      carbon of amino acid at position 8 by the linker
      -(CH2)6-CH=CH-(CH2)3-

<400> SEQUENCE: 19

Lys Gly Thr Ile Leu Lys Ala Xaa Val Asp Tyr Ile Arg Lys Xaa Gln
1               5                   10                  15

<210> SEQ ID NO 20
<211> LENGTH: 17
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (8)..(8)
<223> OTHER INFORMATION: X is an amino acid with side chain -CH3; the
      alpha carbon of this amino acid being connected to the alpha
      carbon of amino acid at position 15 by the linker
```

```
              -(CH2)6-CH=CH-(CH2)3-
<220> FEATURE:
<221> NAME/KEY: MISC_FEATURE
<222> LOCATION: (15)..(15)
<223> OTHER INFORMATION: X is an amino acid with side chain -CH3; the
      alpha carbon of this amino acid being connected to the alpha
      carbon of amino acid at position 8 by the linker
      -(CH2)6-CH=CH-(CH2)3-

<400> SEQUENCE: 20

Arg Arg Arg Arg Phe Asn Ile Xaa Asp Arg Ile Lys Glu Leu Xaa Thr
1               5                  10                  15

Leu

<210> SEQ ID NO 21
<211> LENGTH: 17
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (3)..(3)
<223> OTHER INFORMATION: X is an amino acid with side chain -CH3; the
      alpha carbon of this amino acid being connected to the alpha
      carbon of amino acid at position 10 by the linker
      -(CH2)6-CH=CH-(CH2)3-
<220> FEATURE:
<221> NAME/KEY: MISC_FEATURE
<222> LOCATION: (10)..(10)
<223> OTHER INFORMATION: X is an amino acid with side chain -CH3; the
      alpha carbon of this amino acid being connected to the alpha
      carbon of amino acid at position 3 by the linker
      -(CH2)6-CH=CH-(CH2)3-

<400> SEQUENCE: 21

Arg Arg Xaa Arg Phe Asn Ile Asn Asp Xaa Ile Lys Glu Leu Gly Thr
1               5                  10                  15

Leu

<210> SEQ ID NO 22
<211> LENGTH: 17
<212> TYPE: PRT
<213> ORGANISM: Artificial Sequence
<220> FEATURE:
<223> OTHER INFORMATION: peptide
<220> FEATURE:
<221> NAME/KEY: MISC_FEATURE
<222> LOCATION: (4)..(4)
<223> OTHER INFORMATION: X is an amino acid with side chain -CH3; the
      alpha carbon of this amino acid being connected to the alpha
      carbon of amino acid at position 11 by the linker
      -(CH2)6-CH=CH-(CH2)3-
<220> FEATURE:
<221> NAME/KEY: MISC_FEATURE
<222> LOCATION: (11)..(11)
<223> OTHER INFORMATION: X is an amino acid with side chain -CH3; the
      alpha carbon of this amino acid being connected to the alpha
      carbon of amino acid at position 4 by the linker
      -(CH2)6-CH=CH-(CH2)3-

<400> SEQUENCE: 22

Arg Arg Phe Xaa Ile Asn Asp Arg Ile Lys Xaa Leu Gly Thr Leu Ile
1               5                  10                  15

Pro

<210> SEQ ID NO 23
<211> LENGTH: 17
<212> TYPE: PRT
<213> ORGANISM: Artificial Sequence
```

```
<220> FEATURE:
<223> OTHER INFORMATION: peptide
<220> FEATURE:
<221> NAME/KEY: MISC_FEATURE
<222> LOCATION: (6)..(6)
<223> OTHER INFORMATION: X is an amino acid with side chain -CH3; the
      alpha carbon of this amino acid being connected to the alpha
      carbon of amino acid at position 13 by the linker
      -(CH2)6-CH=CH-(CH2)3-
<220> FEATURE:
<221> NAME/KEY: MISC_FEATURE
<222> LOCATION: (13)..(13)
<223> OTHER INFORMATION: X is an amino acid with side chain -CH3; the
      alpha carbon of this amino acid being connected to the alpha
      carbon of amino acid at position 6 by the linker
      -(CH2)6-CH=CH-(CH2)3-

<400> SEQUENCE: 23

Arg Arg Phe Asn Ile Xaa Asp Arg Ile Lys Glu Leu Xaa Thr Leu Ile
1               5                   10                  15

Pro

<210> SEQ ID NO 24
<211> LENGTH: 16
<212> TYPE: PRT
<213> ORGANISM: Artificial Sequence
<220> FEATURE:
<223> OTHER INFORMATION: peptide

<400> SEQUENCE: 24

Trp Asn Lys Gly Thr Ile Leu Lys Ala Ser Val Asp Tyr Ile Arg Lys
1               5                   10                  15

<210> SEQ ID NO 25
<211> LENGTH: 16
<212> TYPE: PRT
<213> ORGANISM: Artificial Sequence
<220> FEATURE:
<223> OTHER INFORMATION: peptide

<400> SEQUENCE: 25

Asn Lys Gly Thr Ile Leu Lys Ala Ser Val Asp Tyr Ile Arg Lys Leu
1               5                   10                  15

<210> SEQ ID NO 26
<211> LENGTH: 16
<212> TYPE: PRT
<213> ORGANISM: Artificial Sequence
<220> FEATURE:
<223> OTHER INFORMATION: peptide

<400> SEQUENCE: 26

Lys Gly Thr Ile Leu Lys Ala Ser Val Asp Tyr Ile Arg Lys Leu Gln
1               5                   10                  15
```